(12) United States Patent
Fukaumi et al.

(10) Patent No.: US 10,563,088 B2
(45) Date of Patent: Feb. 18, 2020

(54) PHOTOCURABLE AND THERMOSETTING RESIN COMPOSITION, CURED PRODUCT, AND LAMINATE

(71) Applicant: Kaneka Corporation, Osaka (JP)

(72) Inventors: Hiroki Fukaumi, Hyogo (JP); Youichi Matsuo, Hyogo (JP); Atsushi Tsukao, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 15/622,503

(22) Filed: Jun. 14, 2017

(65) Prior Publication Data

US 2017/0283649 A1 Oct. 5, 2017

Related U.S. Application Data

(63) Continuation of application No. PCT/JP2015/083911, filed on Dec. 2, 2015.

(30) Foreign Application Priority Data

Dec. 16, 2014 (JP) ................................. 2014-254404
Mar. 27, 2015 (JP) ................................. 2015-067512

(51) Int. Cl.
| | | |
|---|---|---|
| *C09D 171/00* | (2006.01) | |
| *C09D 7/40* | (2018.01) | |
| *C08K 3/22* | (2006.01) | |
| *C08G 59/20* | (2006.01) | |
| *C08J 7/04* | (2006.01) | |
| *C08L 63/00* | (2006.01) | |
| *C09D 163/00* | (2006.01) | |
| *C08G 77/08* | (2006.01) | |
| *B05D 7/24* | (2006.01) | |
| *C08K 3/36* | (2006.01) | |
| *C09D 183/06* | (2006.01) | |
| *B32B 27/00* | (2006.01) | |
| *C08L 83/06* | (2006.01) | |
| *C09D 7/61* | (2018.01) | |
| *C08G 65/26* | (2006.01) | |

(52) U.S. Cl.
CPC ............ *C09D 171/00* (2013.01); *B05D 7/24* (2013.01); *B32B 27/00* (2013.01); *C08G 59/20* (2013.01); *C08G 65/2615* (2013.01); *C08G 65/2624* (2013.01); *C08G 65/2627* (2013.01); *C08G 65/2639* (2013.01); *C08G 77/08* (2013.01); *C08J 7/04* (2013.01); *C08J 7/047* (2013.01); *C08K 3/22* (2013.01); *C08K 3/36* (2013.01); *C08L 63/00* (2013.01); *C08L 83/06* (2013.01); *C09D 7/40* (2018.01); *C09D 7/61* (2018.01); *C09D 7/67* (2018.01); *C09D 163/00* (2013.01); *C09D 183/06* (2013.01); *C08J 2369/00* (2013.01); *C08J 2471/00* (2013.01)

(58) Field of Classification Search
CPC .......... C09D 171/00; C09D 7/61; C09D 7/67; C09D 7/40; C09D 183/06; C09D 163/00; C08L 83/06; C08L 63/00; C08G 65/2615; C08G 65/2627; C08G 65/2639; C08G 77/08; C08G 59/20; C08J 7/047; C08J 7/04; C08J 2471/00; C08J 2369/00; C08K 3/36; C08K 3/22; B05D 7/24; B32B 27/00

See application file for complete search history.

(56) References Cited

U.S. PATENT DOCUMENTS

| | | | |
|---|---|---|---|
| 5,260,361 A | 11/1993 | Fukushima et al. | |
| 5,457,003 A * | 10/1995 | Tanaka | G03F 7/0757 430/169 |
| 5,492,981 A | 2/1996 | Hoehn et al. | |
| 5,605,997 A | 2/1997 | Yamamoto et al. | |
| 5,650,474 A | 7/1997 | Yamaya et al. | |
| 5,883,214 A | 3/1999 | Wipfelder et al. | |
| 7,049,044 B2 | 5/2006 | Gonsalves et al. | |
| 9,139,700 B2 | 9/2015 | Kusunoki et al. | |
| 9,340,649 B2 | 5/2016 | Kusunoki et al. | |
| 2006/0009547 A1 | 1/2006 | Maeshima et al. | |
| 2006/0225612 A1 | 10/2006 | Lejeune et al. | |
| 2006/0225613 A1 | 10/2006 | Lejeune et al. | |
| 2007/0071684 A1 | 3/2007 | Crutchley et al. | |
| 2009/0269504 A1 * | 10/2009 | Liao | C08J 7/047 427/515 |
| 2010/0146864 A1 | 6/2010 | Nakayama et al. | |

(Continued)

FOREIGN PATENT DOCUMENTS

| | | |
|---|---|---|
| CN | 1688561 A | 10/2005 |
| CN | 101189281 A | 5/2008 |

(Continued)

OTHER PUBLICATIONS

Office Action issued in Chinese Application No. 201580068395.1, dated Jul. 27, 2018 (10 pages).

(Continued)

*Primary Examiner* — Jessica M Roswell
(74) *Attorney, Agent, or Firm* — Osha Liang LLP

(57) ABSTRACT

A curable composition includes a condensation product having a weight average molecular weight of 30,000 or less and a curing agent, the condensation product being obtained by hydrolysis and condensation of a first and second silane compound in the presence of a neutral salt catalyst. The condensation product also has a ratio Y/X of 0.2 or less, wherein X is the number of moles of an $OR^3$ group directly bonded to silicon atoms of the first and second silane compounds, and Y is the number of moles of an $OR^3$ group directly bonded to a silicon atom of the condensation product. The first silane compound is represented by $R^1$—$(SiR^2_a(OR^3)_{3-a})$, and the second silane compound is represented by $R^4$—$(SiR^2_a(OR^3)_{3-a})$.

15 Claims, No Drawings

(56) References Cited

U.S. PATENT DOCUMENTS

| | | | | |
|---|---|---|---|---|
| 2011/0112221 A1* | 5/2011 | Lejeune | ............... | C08G 77/14 523/425 |
| 2011/0314745 A1 | 12/2011 | Nakayama et al. | | |
| 2012/0107732 A1* | 5/2012 | Qiu | ..................... | G03F 7/038 430/5 |
| 2014/0213809 A1 | 7/2014 | Kusunoki et al. | | |
| 2016/0159827 A1 | 6/2016 | Kusunoki et al. | | |

FOREIGN PATENT DOCUMENTS

| | | | |
|---|---|---|---|
| CN | 102066464 | A | 5/2011 |
| CN | 102597116 | A | 7/2012 |
| JP | H05230397 | A | 9/1993 |
| JP | H06-345870 | A | 12/1994 |
| JP | H07-097433 | A | 4/1995 |
| JP | H07-292108 | A | 11/1995 |
| JP | H08-104753 | A | 4/1996 |
| JP | H09-501964 | A | 2/1997 |
| JP | 2000109695 | A | 4/2000 |
| JP | 2002-265605 | A | 9/2002 |
| JP | 2004204228 | A | 7/2004 |
| JP | 2005015581 | A | 1/2005 |
| JP | 2008-37101 | A | 2/2008 |
| JP | 2008285502 | A | 11/2008 |
| JP | 2011518666 | A | 6/2011 |
| JP | 2011184700 | A | 9/2011 |
| JP | 2012533675 | A | 12/2012 |
| JP | 2014-080477 | A | 5/2014 |
| JP | 2014-167091 | A | 9/2014 |
| WO | 2006/110331 | A1 | 10/2006 |
| WO | 2007/18069 | A1 | 2/2007 |
| WO | 2009131680 | A1 | 10/2009 |
| WO | 2011011167 | A2 | 1/2011 |

OTHER PUBLICATIONS

International Preliminary Report on Patentability issued in International Application No. PCT/JP2015/083911; dated Jun. 22, 2017 (5 pages).
International Search Report issued in International Application No. PCT/JP2015/083911; dated Jan. 12, 2016 (2 pages).
Extended European Search Report issued in European Application No. 15869802.7, dated May 2, 2018 (5 pages).
Office Action issued in Japanese Application No. 2015-522995; dated Jun. 19, 2018 (19 pages).
First Office Action issued in Chinese Application No. 201480035324.7 (14 pages).
International Search Report issued in International Application No. PCT/JP2014/066548; dated Jul. 22, 2014 (4 pages).
English Translation of the International Preliminary Report on Patentability issued in International Application No. PCT/JP2014/066548; dated Dec. 22, 2015 (6 pages).
Office Action issued in U.S. Appl. No. 14/899,826; dated Jan. 22, 2018 (9 pages).
Final Office Action issued in U.S. Appl. No. 14/899,826; dated Jun. 21, 2018 (11 pages).

* cited by examiner

PHOTOCURABLE AND THERMOSETTING RESIN COMPOSITION, CURED PRODUCT, AND LAMINATE

TECHNICAL FIELD

One or more embodiments of the present invention relate to a curable composition containing a silane condensation product which has been obtained with use of neither an acid catalyst nor a base catalyst and which has a hydrolyzable group. One or more embodiments of the present invention also relate to a cured product and a laminate each of which is obtained by curing the curable composition.

BACKGROUND

Conventionally, studies have been made on synthesis of condensation products by hydrolysis and condensation reaction, with use of a sol-gel method in which a silane compound having a hydrolyzable silyl group is used as a material. Such condensation products are to be used in hard coating agents for plastic materials and ceramic materials, protective films for liquid crystal display elements, semiconductor electric insulation materials, curing agents for coating materials, and the like.

For example, Patent Literature 1 discloses a method for producing an alkoxysilane condensation product in the presence of an acid catalyst. In this method, tetrafunctional alkoxysilane such as tetraethoxysilane is used as a material. Meanwhile, Patent Literature 2 discloses a production method for hydrolyzing/condensing (i.e., hydrolyzing and condensing) trifunctional organic alkoxysilane such as vinyl trimethoxysilane in the presence of a base catalyst.

As described above, according to a general sol-gel method, hydrolysis and condensation are accelerated by use of an acid catalyst or a base catalyst. However, since acids and bases are often caustic substances, technical consideration is essential in regard to corrosion of a reactor material or a storage equipment material. Further, in many cases, removal or neutralization of an acid or a base after synthesis is required in practice. It is however not easy to completely remove an acid or a base. Further, in a case where neutralization is carried out, a process is complicated and impurities increase (see Patent Literature 3).

Further, when an acid catalyst or a base catalyst is used in hydrolysis and condensation of a silane compound containing a highly active organic functional group such as an epoxy group, an organic functional group is destroyed and consequently deactivated.

Patent Literature 4 reports a technique according to which a fluoride salt as a neutral compound is used as a catalyst. The term "neutral" in Patent Literature 4 does not mean that an aqueous solution of a fluoride salt itself exhibits neutrality in terms of pH, but merely means that in a case where a fluoride salt is dissolved in water, a counter ion of a fluoride ion is not a hydrogen ion. In fact, many aqueous solutions of a fluoride salt exhibit weak acidity. Further, many fluoride salts are known to produce a highly toxic hydrofluoric acid in an acid aqueous solution. Further, a concern exists in that silanol produced in reaction may promote generation of hydrofluoric acid.

CITATION LIST

Patent Literatures

[Patent Literature 1] Japanese Patent Application Publication, Tokukai, No. 2002-265605 (Publication Date: Sep. 18, 2002)

[Patent Literature 2] Japanese Patent Application Publication, Tokukai, No. 2008-37101 (Publication Date: Feb. 21, 2008)

[Patent Literature 3] PCT International Publication, No. WO 2007/18069 (Publication Date: Feb. 15, 2007)

[Patent Literature 4] Japanese Patent Application Publication, Tokukaihei, No. 7-292108 (1995) (Publication Date: Nov. 7, 1995)

SUMMARY

Among metal alkoxide precursors, a compound containing silicon, exceptionally, is unlikely to hydrolyze and condensate. Accordingly, a condensation reaction of a silane compound having a hydrolyzable silyl group is accelerated by using, as a catalyst, an acid or a base so that a reaction time will be shortened. However, in a case where the silicon compound to be condensed has an epoxy group, such an acid catalyst or a base catalyst may cause deactivation and/or gelatinization of the epoxy group.

On the other hand, in a state of low reactivity such as a state under the presence of no catalyst, progress of condensation is slow and a lot of time is required for hydrolysis and condensation. Consequently, in a case where a silicon compound to be condensed has an epoxy group, the epoxy group may be hydrolyzed.

One or more embodiments of the present invention provide a method to obtain an epoxysilane condensation product having a high epoxy group residual ratio, by accelerating, with use of neither an acid catalyst nor a base catalyst, condensation reaction of a silane compound having a hydrolyzable silyl group, and to obtain, by curing the epoxysilane condensation product thus obtained, a cured product which has high abrasion resistance, high chemical resistance and low cure shrinkage.

The inventors have found the following.

The following describes aspects of one or more embodiments of the present invention.

[1] A curable composition including:
a condensation product (A) having a weight average molecular weight of 30,000 or less; and
a curing agent (B) which cures an epoxy group,
the condensation product (A) being obtained by hydrolysis and condensation of a silane compound (I) and a silane compound (II) in the presence of a neutral salt catalyst, a molar ratio of the silane compound (II) to the silane compound (I) being 9 or less,
the condensation product (A) having a ratio Y/X of 0.2 or less, where X is the number of moles of an $OR^3$ group directly bonded to silicon atoms of the silane compounds (I) and (II) which are materials of the condensation product (A) and Y is the number of moles of an $OR^3$ group directly bonded to a silicon atom of the condensation product (A),
the silane compound (I) having a hydrolyzable silyl group and being represented by the following General Formula (I):

$$R^1-(SiR^2_a(OR^3)_{3-a}) \qquad (I),$$

wherein $R^1$ is an alkyl group having 1 to 10 carbon atoms and having a terminal substituted with an epoxy structure-containing group, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2, and the silane compound (II) having a hydrolyzable silyl group and being represented by the following General Formula (II):

$$R^4—(SiR^2{}_a(OR^3)_{3-a})  \quad (II),$$

wherein $R^4$ is a group having no epoxy structure-containing group and selected from among a substituted or unsubstituted alkyl group, an alkenyl group, and a substituted aryl group, each of which has 1 to 10 carbon atoms, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.

[2] The curable composition as set forth in [1], wherein:
the neutral salt catalyst is a salt made of a combination of a cation and an anion;
the cation is any one selected from the group consisting of Group 1 element ions, Group 2 element ions, a tetraalkylammonium ion, and a guanidium ion; and
the anion is any one selected from the group consisting of a sulfate ion, a nitrate ion, a perchlorate ion, and Group 17 element ions except for a fluoride ion.

[3] The curable composition as set forth in [1] or [2], wherein:
the neutral salt catalyst is a salt made of a combination of a cation and an anion;
the cation is any one selected from the group consisting of Group 1 element ions and Group 2 element ions; and
the anion is any one selected from the group consisting of a chloride ion, a bromide ion, and an iodide ion.

[4] The curable composition as set forth in any one of [1] to [3], wherein the curing agent (B) is an acid-forming agent which carries out cationic polymerization of the epoxy group.

[5] The curable composition as set forth in any one of [1] to [4], wherein the curing agent (B) is a compound containing a fluorophosphate group, a fluoroantimonate group or a fluoroborate group.

[6] The curable composition as set forth in any one of [1] to [5], further including a metal-oxide-fine-particle (C) having an average particle diameter of 100 nm or less.

[7] The curable composition as set forth in [6], wherein the metal-oxide-fine-particle (C) is a silica fine particle.

[8] The curable composition as set forth in any one of [1] to [7], wherein:
in a case where the curing agent (B) is a curing agent which polymerizes the epoxy group, an amount of the curing agent (B) is 0.5 parts by weight to 10 parts by weight with respect to 100 parts by weight of the condensation product (A);
in a case where the curing agent (B) is a curing agent which cures the epoxy group when added to the epoxy group, an amount of the curing agent (B) is 10 parts by weight to 150 parts by weight with respect to 100 parts by weight of the condensation product (A); and
an amount of the metal-oxide-fine-particle (C) is 0 parts by weight to 150 parts by weight with respect to 100 parts by weight of the condensation product (A).

[9] The curable composition as set forth in any one of [1] to [8], wherein the curing agent (B) is a compound containing at least one selected from the group consisting of a triphenylsulfonium group, a diphenylsulfonium group, and a diphenyliodonium group.

[10] The curable composition as set forth in any one of [1] to [9], wherein the curing agent (B) is a curing agent which cures the epoxy group of the curable composition being irradiated with an active energy ray.

[11] A cured product obtained by curing the curable composition as set forth in any one of [1] to [10].

[12] A method for producing a laminate, including the steps of:
applying, to a base material, the curable composition as set forth in any one of [1] to [10]; and
forming a cured coating by curing the curable composition.

[13] A laminate obtained by the method as set forth in [12].

One or more embodiments of the present invention make it possible to obtain a cured product which has high abrasion resistance, high chemical resistance, high hardness and low cure shrinkage and which contains a condensate of an epoxysilane compound having a high epoxy group residual ratio. This condensation product is a condensation product which has been obtained by accelerating, with use of neither an acid catalyst nor a base catalyst, condensation reaction of an epoxysilane compound having a hydrolyzable silyl group.

DESCRIPTION OF EMBODIMENTS

A curable composition, in accordance with one or more embodiments of the present invention, is made of a siloxane resin that is an epoxysilane compound having a hydrolyzable silyl group. The curable composition is produced by: obtaining a condensation product (A) by hydrolyzing and condensing, with use of a neutral salt as a catalyst, silane compounds each having a hydrolyzable silyl group, which silane compounds are represented by the following General Formulae (I) and (II), respectively, and (ii) then mixing a curing agent (B) which cures an epoxy group.

General Formula (I):

$$R^1—(SiR^2{}_a(OR^3)_{3-a})  \quad (I)$$

(In General Formula (I), $R^1$ is an alkyl group having 1 to 10 carbon atoms and having a terminal substituted with an epoxy structure-containing group, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.)

General Formula (II):

$$R^4—(SiR^2{}_a(OR^3)_{3-a})  \quad (II)$$

(In General Formula (II), $R^4$ is a group having no epoxy structure-containing group and selected from among a substituted or unsubstituted alkyl group, an alkenyl group, and a substituted aryl group, each of which has 1 to 10 carbon atoms, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.)

In one or more embodiments, the condensation product (A) has a weight average molecular weight of 30,000 or less, and is obtained by hydrolysis and condensation of a silane compound (I) and a silane compound (II) in the presence of a neutral salt catalyst. A molar ratio of the silane compound (II) to the silane compound (I) is 9 or less. The condensation product (A) has a ratio Y/X of 0.2 or less, where X is the number of moles of an $OR^3$ group directly bonded to silicon atoms of the silane compounds (I) and (II) and Y is the number of moles of an $OR^3$ group directly bonded to a silicon atom of the condensation product (A).

<(A) Condensation Product>

In one or more embodiments, the silane compound (I) having a hydrolyzable silyl group is represented by the following General Formula (I):

$$R^1\!-\!(SiR^2_a(OR^3)_{3-a}) \qquad (I),$$

wherein $R^1$ is an alkyl group having 1 to 10 carbon atoms and having a terminal substituted with an epoxy structure-containing group, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.

In one or more embodiments, the silane compound (II) having a hydrolyzable silyl group is represented by the following General Formula (II):

$$R^4\!-\!(SiR^2_a(OR^3)_{3-a}) \qquad (II),$$

wherein $R^4$ is a group having no epoxy structure-containing group and selected from among a substituted or unsubstituted alkyl group, an alkenyl group, and a substituted aryl group, each of which has 1 to 10 carbon atoms, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.

Examples of the alkyl group, as $R^1$ in General Formula (I), having 1 to 10 carbon atoms and having a terminal substituted with an epoxy structure-containing group, include a methyl group, an ethyl group, a propyl group, an isopropyl group, a butyl group, an isobutyl group, an amyl group, an isoamyl group, a hexyl group, a cyclohexyl group, a cyclohexylmethyl group, a cyclohexylethyl group, a heptyl group, an isoheptyl group, an n-octyl group, an isooctyl group, a 2-ethylhexyl group, and the like groups.

In one or more embodiments, the epoxy structure-containing group in $R^1$ of General Formula (I) only needs to be a functional group containing an epoxy group. Examples of the epoxy structure-containing group include an epoxy group, a glycidyl ether group, an epoxycyclohexyl group, and the like groups.

In a case where the alkyl group is a straight chain alkyl group, the "terminal" is a methyl group most distal to Si. Meanwhile, in a case where the alkyl group has a branched chain, the "terminal" can be a methyl group most distal to Si of a main chain, and/or a methyl group(s) of one or more branched chains.

In one or more embodiments, $R^2$ in each of General Formulae (I) and (II) is a hydrogen atom or a monovalent hydrocarbon group selected from among an alkyl group having 1 to 10 carbon atoms, an aryl group having 6 to 25 carbon atoms, and an aralkyl group having 7 to 12 carbon atoms. Examples of such a hydrocarbon group include a methyl group, an ethyl group, a propyl group, a butyl group, a pentyl group, a hexyl group, an octyl group, a nonyl group, a decyl group, a phenyl group, a tolyl group, a xylyl group, a naphthyl group, a benzyl group, a phenethyl group, and the like groups.

In one or more embodiments, $R^3$ in each of General Formulae (I) and (II) is a hydrogen atom or an alkyl group having 1 to 10 carbon atoms. Examples of the alkyl group include a methyl group, an ethyl group, a propyl group, a butyl group, a pentyl group, a hexyl group, an octyl group, a nonyl group, a decyl group and the like groups. In view of easy hydrolysis and condensation of the silane compound having a hydrolyzable silyl group, the alkyl group of $R^3$ has preferably 1 to 3 carbon atoms, and most preferably 1 carbon atom.

In one or more embodiments, $R^4$ in General Formula (II) is a group which is selected from among a substituted or unsubstituted alkyl group, an alkenyl group, and a substituted aryl group, each of which has 1 to 10 carbon atoms, and has no epoxy structure-containing group. Examples of the alkyl group include a methyl group, an ethyl group, a propyl group, an isopropyl group, a butyl group, an isobutyl group, a pentyl group, an amyl group, an isoamyl group, a hexyl group, a cyclohexyl group, a cyclohexylmethyl group, a cyclohexylethyl group, a heptyl group, an isoheptyl group, an n-octyl group, an isooctyl group, a 2-ethylhexyl group, a nonyl group, a decyl group, and the like groups. Examples of a substituent of the alkyl group include a thiol group, an amino group, an isocyanate group, a (meth)acryloyl group, a phenyl group, and a chloro group. Examples of the alkenyl group include a vinyl group, an allyl group, a 1-methylethenyl group, a 2-methylethenyl group, a 2-propenyl group, a 1-methyl-3-propenyl group, a 3-butenyl group, a 4-pentenyl group, a 5-hexenyl group, a cyclohexenyl group, a bicyclohexenyl group, a 6-heptenyl group, a 7-octenyl group, a decenyl group, a pentadecenyl group, eicosenyl group, tricosenyl group, and the like groups. An example of the substituted aryl group includes a styryl group.

In one or more embodiments, in view of good storage stability, fast curing in irradiation with an active energy ray, and capability of prevention of crack formation in a resultant coating film, in a case where $R^4$ is an unsubstituted alkyl group, $R^4$ is preferably an alkyl group having 3 or more and 10 or less carbon atoms, and more preferably an alkyl group having 3 or more and 6 or less carbon atoms among the above groups. Meanwhile, in a case where $R^4$ is a substituted alkyl group, the alkyl group is preferably an alkyl group having 3 or more and 10 or less carbon atoms and more preferably an alkyl group having 3 or more and 6 or less carbon atoms and the substituent is preferably any of a phenyl group, a cyclohexyl group, and a (meth)acryloyl group. In a case where $R^4$ is an alkenyl group, $R^4$ is preferably a vinyl group or an allyl group. The substituted aryl group is preferably a styryl group. In a case where $R^4$ is an unsubstituted alkyl group having 2 or less carbon atoms or in a case where $R^4$ is a substituted alkyl group having a substituent that is less bulky than each of the phenyl group, the cyclohexyl group and the (meth)acryloyl group, a dense crosslinked structure may be formed in crosslinking and this may lead to gelatinization. Meanwhile, in a case where the alkyl group has 11 or more carbon atoms or in a case where the alkyl group is a substituted alkyl group having a substituent that is bulkier than each of the phenyl group, the cyclohexyl group, and the (meth)acryloyl group, an increased hydrophobicity may lead to an extremely low hydrolysis rate or a curing rate may decrease in irradiation with an active energy ray.

In one or more embodiments, in each of General Formulae (I) and (II), a is an integer of 0 to 2 and appropriately selected in accordance with a physical property which the curable composition is required to have.

Examples of the silane compound (I) include:

glycidyl group-containing silanes such as 1-glycidyloxymethyl trimethoxysilane, 1-glycidyloxymethylmethyl dimethoxysilane, 1-glycidyloxymethyl triethoxysilane, 1-glycidyloxymethylmethyl diethoxysilane, 2-glycidyloxyethyl trimethoxysilane, 2-glycidyloxyethylmethyl dimethoxysilane, 2-glycidyloxyethyl triethoxysilane, 2-glycidyloxyethylmethyl diethoxysilane, 3-glycidyloxypropyl trimethoxysilane, 3-glycidyloxypropylmethyl dimethoxysilane, 3-glycidyloxypropyl triethoxysilane, 3-glycidyloxypropylmethyl diethoxysilane, 4-glycidyloxybutyl trimethoxysilane, 4-glycidyloxybutylmethyl dimethoxysilane, 4-glycidyloxybutyl triethoxysilane, 4-glycidyloxybutylmethyl diethoxysilane, 6-glycidyloxyhexyl trimethoxysilane, 6-glycidyloxyhexylmethyl dimethoxysilane, 6-glycidyloxyhexyl triethoxysilane, 6-glycidyloxyhexylmethyl diethoxysilane, 8-glycidyloxyoctyl trimethoxysilane, 8-glycidyloxyoctylmethyl dimethoxysilane, 8-glycidyloxyoctyl triethoxysilane, and 8-glycidyloxyoctylmethyl diethoxysilane;

alicyclic epoxy group-containing silanes such as 1-(3,4-epoxycyclohexyl)methyl trimethoxysilane, 1-(3,4-epoxycyclohexyl)methylmethyl dimethoxysilane, 1-(3,4-epoxycyclohexyl)methyl triethoxysilane, 1-(3,4-epoxycyclohexyl)methylmethyl diethoxysilane, 2-(3,4-epoxycyclohexyl)ethyl trimethoxysilane, 2-(3,4-epoxycyclohexyl)ethylmethyl dimethoxysilane, 2-(3,4-epoxycyclohexyl)ethyl triethoxysilane, 2-(3,4-epoxycyclohexyl)ethylmethyl diethoxysilane, 3-(3,4-epoxycyclohexyl)propyl trimethoxysilane, 3-(3,4-epoxycyclohexyl)propylmethyl dimethoxysilane, 3-(3,4-epoxycyclohexyl)propyl triethoxysilane, 3-(3,4-epoxycyclohexyl)propylmethyl diethoxysilane, 4-(3,4-epoxycyclohexyl)butyl trimethoxysilane, 4-(3,4-epoxycyclohexyl)butylmethyl dimethoxysilane, 4-(3,4-epoxycyclohexyl)butyl triethoxysilane, 4-(3,4-epoxycyclohexyl)butylmethyl diethoxysilane, 6-(3,4-epoxycyclohexyl)hexyl trimethoxysilane, 6-(3,4-epoxycyclohexyl)hexylmethyl dimethoxysilane, 6-(3,4-epoxycyclohexyl)hexyl triethoxysilane, 6-(3,4-epoxycyclohexyl)hexylmethyl diethoxysilane, 8-(3,4-epoxycyclohexyl)octyl trimethoxysilane, 8-(3,4-epoxycyclohexyl)octylmethyl dimethoxysilane, 8-(3,4-epoxycyclohexyl)octyl triethoxysilane, and 8-(3,4-epoxycyclohexyl)octylmethyl diethoxysilane;

epoxy group-containing silanes such as epoxy trimethoxysilane, epoxymethyl dimethoxysilane, epoxy triethoxysilane, epoxymethyl diethoxysilane, 1-epoxymethyl trimethoxysilane, 1-epoxymethylmethyl dimethoxysilane, 1-epoxymethyl triethoxysilane, 1-epoxymethylmethyl diethoxysilane, 2-epoxyethyl trimethoxysilane, 2-epoxyethylmethyl dimethoxysilane, 2-epoxyethyl triethoxysilane, 2-epoxyethylmethyl diethoxysilane, 3-epoxypropyl trimethoxysilane, 3-epoxypropylmethyl dimethoxysilane, 3-epoxypropyl triethoxysilane, 3-epoxypropylmethyl diethoxysilane, 4-epoxybutyl trimethoxysilane, 4-epoxybutylmethyl dimethoxysilane, 4-epoxybutyl triethoxysilane, 4-epoxybutylmethyl diethoxysilane, 6-epoxyhexyl trimethoxysilane, 6-epoxyhexylmethyl dimethoxysilane, 6-epoxyhexyl triethoxysilane, 6-epoxyhexylmethyl diethoxysilane, 8-epoxyoctyl trimethoxysilane, 8-epoxyoctylmethyl dimethoxysilane, 8-epoxyoctyl triethoxysilane, and 8-epoxyoctylmethyl diethoxysilane; and the like.

In one or more embodiments, as described above, in view of easy hydrolysis and condensation of a silane compound having a hydrolyzable silyl group, the alkyl group of $R^3$ in General Formula (I) has preferably 1 to 3 carbon atoms and most preferably 1 carbon atom. Further, in view of reactivity (mobility) of the epoxy group in curing, the number of carbon atoms in an alkylene group bonding the epoxy group and a silicon atom is an important matter. This number of carbon atoms is preferably 1 to 4 and more preferably 2 or 3.

In one or more embodiments, in light of the above views in combination, among the above, the silane compound (I) is preferably a compound in which $R^1$ is a 2-(3,4-epoxycyclohexyl)ethyl group or a 3-glycidyloxypropyl group. Specifically, the silane compound (I) is preferably 2-(3,4-epoxycyclohexyl)ethyl trimethoxysilane, 2-(3,4-epoxycyclohexyl)ethylmethyl dimethoxysilane, 3-(3,4-epoxycyclohexyl)propyl trimethoxysilane, 3-(3,4-epoxycyclohexyl)propylmethyl dimethoxysilane, 2-glycidyloxyethyl trimethoxysilane, 2-glycidyloxyethylmethyl dimethoxysilane, 3-glycidyloxypropyl trimethoxysilane, or 3-glycidyloxypropylmethyl dimethoxysilane.

In one or more embodiments, among silane compounds (II), examples of a silane compound (II) in which $R^4$ in General Formula (II) is an unsubstituted alkyl group include methyl trimethoxysilane, dimethyl dimethoxysilane, methyl triethoxysilane, dimethyl diethoxysilane, ethyl trimethoxysilane, ethylmethyl dimethoxysilane, ethyl triethoxysilane, ethylmethyl diethoxysilane, propyl trimethoxysilane, propylmethyl dimethoxysilane, propyl triethoxysilane, propylmethyl diethoxysilane, butyl trimethoxysilane, butylmethyl dimethoxysilane, butyl triethoxysilane, butylmethyl diethoxysilane, hexyl trimethoxysilane, hexylmethyl dimethoxysilane, hexyl triethoxysilane, hexylmethyl diethoxysilane, octyl trimethoxysilane, octyl methyl dimethoxysilane, octyl triethoxysilane, octyl methyl diethoxysilane, and the like.

Further, examples of a silane compound (II) in which $R^4$ in General Formula (II) is a substituted alkyl group include compounds below. Here, the substituent is not specifically limited, but in view of availability, the substituent is preferably a thiol group, a (meth)acryloyl group, a phenyl group, a cyclohexyl group or a chloro group.

However, among the above substituents, the thiol (mercapto) group may react with the epoxy group during hydrolysis and condensation reaction of a hydrolyzable silyl group. Accordingly, in one or more embodiments, it is preferable to select, as the silane compound (I), an epoxysilane compound having an epoxycyclohexyl group that is not susceptible to nucleophilic attack.

On the other hand, a silane compound having, as a substituent, an amino group or acid anhydride group may not be desired since, as compared to a mercapto group, the amino group and the acid anhydride group are each more likely to react with the epoxy group during hydrolysis and condensation reaction with a hydrolyzable silyl group.

Examples of a compound in which $R^4$ is an alkyl group substituted with a thiol group include 1-mercaptomethyl trimethoxysilane, 1-mercaptomethylmethyl dimethoxysilane, 1-mercaptomethyl triethoxysilane, 1-mercaptomethylmethyl diethoxysilane, 2-mercaptoethyl trimethoxysilane, 2-mercaptoethylmethyl dimethoxysilane, 2-mercaptoethyl triethoxysilane, 2-mercaptoethylmethyl diethoxysilane, 3-mercaptopropyl trimethoxysilane, 3-mercaptopropylmethyl dimethoxysilane, 3-mercaptopropyl triethoxysilane, 3-mercaptopropylmethyl diethoxysilane, 4-mercaptobutyl trimethoxysilane, 4-mercaptobutylmethyl dimethoxysilane, 4-mercaptobutyl triethoxysilane, 4-mercaptobutylmethyl diethoxysilane, 6-mercaptohexyl trimethoxysilane, 6-mercaptohexylmethyl dimethoxysilane, 6-mercaptohexyl triethoxysilane, 6-mercaptohexylmethyl diethoxysilane, 8-mercaptooctyl trimethoxysilane, 8-mercaptooctylmethyl dimethoxysilane, 8-mercaptooctyl triethoxysilane, 8-mercaptooctylmethyl diethoxysilane, and the like.

Examples of a compound in which $R^4$ is an alkyl group substituted with an isocyanate group include 1-isocyanatemethyl trimethoxysilane, 1-isocyanatemethylmethyl dimethoxysilane, 1-isocyanatemethyl triethoxysilane, 1-isocyanatemethylmethyl diethoxysilane, 2-isocyanateethyl trimethoxysilane, 2-isocyanateethylmethyl dimethoxysilane, 2-isocyanateethyl triethoxysilane, 2-isocyanateethylmethyl diethoxysilane, 3-isocyanatepropyl trimethoxysilane, 3-isocyanatepropylmethyl dimethoxysilane, 3-isocyanatepropyl triethoxysilane, 3-isocyanatepropylmethyl diethoxysilane, 4-isocyanatebutyl trimethoxysilane, 4-isocyanatebutylmethyl dimethoxysilane, 4-isocyanatebutyl triethoxysilane, 4-isocyanatebutylmethyl diethoxysilane, 6-isocyanatehexyl trimethoxysilane, 6-isocyanatehexylmethyl dimethoxysilane, 6-isocyanatehexyl triethoxysilane, 6-isocyanatehexylmethyl diethoxysilane, 8-isocyanateoctyl trimethoxysilane, 8-isocyanateoctylmethyl dimethoxysilane, 8-isocyanateoctyl triethoxysilane, 8-isocyanateoctylmethyl diethoxysilane, and the like.

Examples of a compound in which $R^4$ is an alkyl group substituted with a (meth)acryloyl group include 1-(meth)acryloyloxymethyl trimethoxysilane, 1-(meth)acryloyloxymethylmethyl dimethoxysilane, 1-(meth)acryloyloxymethyl triethoxysilane, 1-(meth)acryloyloxymethylmethyl diethoxysilane, 2-(meth)acryloyloxyethyl trimethoxysilane, 2-(meth)acryloyloxyethylmethyl dimethoxysilane, 2-(meth)acryloyloxyethyl triethoxysilane, 2-(meth)acryloyloxyethylmethyl diethoxysilane, 3-(meth)acryloyloxypropyl trimethoxysilane, 3-(meth)acryloyloxypropylmethyl dimethoxysilane, 3-(meth)acryloyloxypropyl triethoxysilane, 3-(meth)acryloyloxypropylmethyl diethoxysilane, 4-(meth)acryloyloxybutyl trimethoxysilane, 4-(meth)acryloyloxybutylmethyl dimethoxysilane, 4-(meth)acryloyloxybutyl triethoxysilane, 4-(meth)acryloyloxybutylmethyl diethoxysilane, 6-(meth)acryloyloxyhexyl trimethoxysilane, 6-(meth)acryloyloxyhexylmethyl dimethoxysilane, 6-(meth)acryloyloxyhexyl triethoxysilane, 6-(meth)acryloyloxyhexylmethyl diethoxysilane, 8-(meth)acryloyloxyoctyl trimethoxysilane, 8-(meth)acryloyloxyoctylmethyl dimethoxysilane, 8-(meth)acryloyloxyoctyl triethoxysilane, 8-(meth)acryloyloxy octylmethyl diethoxysilane, and the like.

Examples of a compound in which $R^4$ is an alkyl group substituted with a phenyl group include benzyl trimethoxysilane, benzyl triethoxysilane, 2-phenylethyl trimethoxysilane, 2-phenylethyl triethoxysilane, 3-phenylpropyl trimethoxysilane, 3-phenylpropyl triethoxysilane, 4-phenylbutyl trimethoxysilane, 4-phenylbutyl triethoxysilane, 5-phenylpentyl trimethoxysilane, 5-phenylpentyl triethoxysilane, 6-phenylhexyl trimethoxysilane, 6-phenylhexyl triethoxysilane, and the like.

Examples of a compound in which $R^4$ is an alkyl group substituted with a cyclohexyl group include cyclohexylmethyl trimethoxysilane, cyclohexylmethyl triethoxysilane, 2-cyclohexylethyl trimethoxysilane, 2-cyclohexylethyl triethoxysilane, 3-cyclohexylpropyl trimethoxysilane, 3-cyclohexylpropyl triethoxysilane, 4-cyclohexylbutyl trimethoxysilane, 4-cyclohexylbutyl triethoxysilane, 5-cyclohexylpentyl trimethoxysilane, 5-cyclohexylpentyl triethoxysilane, 6-cyclohexylhexyl trimethoxysilane, 6-cyclohexylhexyl triethoxysilane, and the like.

Examples of a compound in which $R^4$ is an alkyl group substituted with a chloro group include chloromethyl trimethoxysilane, chloromethyl triethoxysilane, 2-chloroethyl trimethoxysilane, 2-chloroethyl triethoxysilane, 3-chloropropyl trimethoxysilane, 3-chloropropyl triethoxysilane, 4-chlorobutyl trimethoxysilane, 4-chlorobutyl triethoxysilane, 5-chloropentyl trimethoxysilane, 5-chloropentyl triethoxysilane, 6-chlorohexyl trimethoxysilane, 6-chlorohexyl triethoxysilane, and the like.

Examples of a compound in which $R^4$ is an alkenyl group include vinyl trimethoxysilane, vinylmethyl dimethoxysilane, vinyl triethoxysilane, vinylmethyl diethoxysilane, allyl trimethoxysilane, allylmethyl dimethoxysilane, allyl triethoxysilane, allylmethyl diethoxysilane, 1-oxetanyloxymethyl trimethoxysilane, 1-oxetanyloxymethylmethyl dimethoxysilane, 1-oxetanyloxymethyl triethoxysilane, 1-oxetanyloxymethylmethyl diethoxysilane, 2-oxetanyloxyethyl trimethoxysilane, 2-oxetanyloxyethylmethyl dimethoxysilane, 2-oxetanyloxyethyl triethoxysilane, 2-oxetanyloxyethylmethyl diethoxysilane, 3-oxetanyloxypropyl trimethoxysilane, 3-oxetanyloxypropylmethyl dimethoxysilane, 3-oxetanyloxypropyl triethoxysilane, 3-oxetanyloxypropylmethyl diethoxysilane, 4-oxetanyloxybutyl trimethoxysilane, 4-oxetanyloxybutylmethyl dimethoxysilane, 4-oxetanyloxybutyl triethoxysilane, 4-oxetanyloxybutylmethyl diethoxysilane, 6-oxetanyloxyhexyl trimethoxysilane, 6-oxetanyloxyhexylmethyl dimethoxysilane, 6-oxetanyloxyhexyl triethoxysilane, 6-oxetanyloxyhexylmethyl diethoxysilane, 8-oxetanyloxyoctyl trimethoxysilane, 8-oxetanyloxyoctylmethyl dimethoxysilane, 8-oxetanyloxyoctyl triethoxysilane, 8-oxetanyloxyoctylmethyl diethoxysilane, and the like.

Examples of a compound in which $R^4$ is a substituted aryl group include p-styryl trimethoxysilane, p-styryl triethoxysilane, and the like.

The condensation product (A) according to one or more embodiments of the present invention should contain at least one kind of each of the silane compounds (I) and (II). For example, the condensation product (A) can contain one kind or two or more kinds of each of the silane compounds (I) and (II). Further, the condensation product (A) can contain one kind of one of the silane compounds (I) and (II) and two or more kinds of the other of the silane compounds (I) and (II). In a case where two or more kinds of such a compound are contained, a ratio of the two or more kinds of such a compound to be used can be any ratio.

In a case where a cured product is required to have, as physical properties, abrasion resistance and/or chemical resistance, the condensation product (A) in the curable composition in accordance with one or more embodiments of the present invention is preferably obtained by hydrolysis and condensation under a condition in which a molar ratio of the silane compound (II) to the silane compound (I) (the number of moles of the silane compound (II)/the number of moles of the silane compound (I)) is 0 or more and 9 or less.

In a case where a molar ratio of a silane compound having a functional group (e.g., a (meth)acryloyl group) that is not the epoxy structure-containing group with respect to the silane compound (I) is more than 9, a cured product having high abrasion resistance and high chemical resistance can be obtained. However, such a functional group has larger cure shrinkage in crosslinking as compared to that of the epoxy group. Accordingly, there is a concern that a crack may be formed in a case where load is applied due to heat and/or moisture. On the other hand, curing of the epoxy structure-containing group is accompanied by a ring-opening reaction, so that less shrinkage occurs. This makes it possible to obtain a cured product by curing that hardly causes cure shrinkage.

Further, there is a concern that in a case where the amount of the epoxy structure-containing group in the condensation product (A) decreases, intermolecular crosslinking may be insufficient and as a result, hardness and/or abrasion resistance may deteriorate. Accordingly, in one or more embodiments, in view of hard coating property (i.e., hardness and abrasion resistance), the molar ratio of the silane compound (II) with respect to the silane compound (I) is preferably 0 or more and 5 or less, more preferably 0 or more and 3 or less, and particularly preferably 0 or more and 1 or less.

The condensation product (A) according to one or more embodiments of the present invention is preferably a dimer to a dictamer having a siloxane bond or siloxane bonds formed by hydrolysis and condensation of the silane compounds.

The weight average molecular weight of the condensation product (A) in accordance with one or more embodiments of the present invention is preferably 500 or more, more preferably 1,000 or more and further preferably 2,000 or more. Meanwhile, the weight average molecular weight of the condensation product (A) is preferably 30,000 or less, more preferably 28,000 or less, and further preferably 25,000 or less.

In a case where the weight average molecular weight of the condensation product (A) is less than 500 (even more, less than 1,000), the condensation product (A) is volatile. Accordingly, there is a concern that when a diluting solvent is removed by heating before curing, part or the whole of the condensation product (A) may volatilize. Further, there is also a concern that a lower weight average molecular weight may result in more deterioration of impact resistance. In addition, there is a concern that in a case where the weight average molecular weight of the condensation product (A) is more than 30,000, compatibility of the condensation product (A) with other substance to be mixed may deteriorate and this may cause white turbidity of the condensation product (A) in forming a coating film. The weight average molecular weight here is a weight average molecular weight measured by GPC (gel permeation chromatography).

In a case where the weight average molecular weight is less than 500 or less than 1000, it is difficult due to the above-described volatile property to have the step of heating (the step of removing a diluting solvent) prior to ultraviolet irradiation on the condensation product (A). However, in this case, the condensation product (A) has a low molecular weight and a low viscosity, so that a coating solution can be prepared with use of no diluting solvent. Accordingly, it is not necessary to heat the condensation product (A) prior to ultraviolet irradiation. Therefore, in one or more embodiments, in a case where the condensation product (A) has a weight average molecular weight of less than 500 or less than 1000, it is preferable to prepare a coating solution containing the condensation product (A) with use of no diluting solvent.

The weight average molecular weight of the siloxane resin (condensation product (A)) can be controlled by appropriately selecting an amount of water and a type and an amount of a catalyst which are to be used in reaction. For example, the weight average molecular weight can be increased by increasing the amount of water initially introduced.

In one or more embodiments, in a case where (i) X is the number of moles of an $OR^3$ group directly bonded to silicon atoms of the silane compounds (I) and (II) which are materials of the condensation product (A) in accordance with one or more embodiments of the present invention and (ii) Y is the number of moles of an $OR^3$ group directly bonded to a silicon atom(s) of the condensation product (A), the ratio Y/X is preferably 0.2 or less, more preferably 0.1 or less, and further preferably 0.05 or less, and most preferably substantially 0.

When the ratio Y/X is more than 0.2, a coating film will shrink over time after irradiation with an active energy ray and this will result in formation of a crack. The ratio Y/X here can be obtained as a result of measurement by $^1$H-NMR and $^{29}$Si-NMR. Note that the ratio Y/X can be arranged to be 0.2 or less by appropriately selecting an amount of water and a type and amount of a catalyst which are to be used in reaction. For example, when the amount of water is larger, hydrolysis will be accelerated more, so that the ratio Y/X will be a low value.

The number of remaining $OR^3$ groups per molecule of the condensation product (A) in accordance with one or more embodiments of the present invention is preferably 2 or less, more preferably 1 or less, further preferably 0.5 or less, particularly preferably 0.1 or less, and most preferably substantially absent.

In one or more embodiments, in view of increasing a crosslinking point density and thereby improving hardness and abrasion resistance of a cured product, the epoxy structure-containing group has preferably a high residual ratio in the condensation product (A), that is, a high ratio of the number of moles of the epoxy structure-containing group in the condensation product (A) with respect to the number of moles of the epoxy structure-containing group of the silane compound (I) as a material of the condensation product (A).

Specifically, the residual ratio of the epoxy structure-containing group in accordance with one or more embodiments of the present invention is preferably 20% or more, more preferably 40% or more, and further preferably 60% or more. The residual ratio of the epoxy structure-containing group here can be obtained by $^1$H-NMR measurement.

In one or more embodiments of the present invention, hydrolysis and condensation reaction are carried out under a neutral salt catalyst (i.e., in the presence of a neutral salt catalyst).

When the hydrolysis and condensation reaction are carried out in the presence of a neutral salt catalyst, a siloxane resin can be obtained while the epoxy group is not deactivated before and after the hydrolysis and condensation reaction and during storage.

Further, since the neutral salt catalyst itself does not corrode a container for production or a container for storage, use of the neutral salt catalyst is not limited by materials of production/storage equipment.

This is for the following reason. In general, in the case of an acid catalyst and a base catalyst, these catalysts themselves react with various substances in an electrophilic/nucleophilic manner. Further, the catalysts change a hydrogen ion concentration and a hydroxide ion concentration in a reaction solution. These cause hydrogen ions and hydroxide ions to contribute to reaction. On the other hand, in the case of a neutral salt, such reaction activity (reaction activity exhibited by the acid catalyst and the base catalyst) is extremely low.

Further, in a case where an acid catalyst and a base catalyst are used in hydrolysis and condensation reaction, the step of removing an acid or a base and/or the step of neutralizing an acid or a base is/are required for the above reason. These steps are complicated and/or lead to a decrease in yield. Therefore, such steps may not be preferable. A neutral salt catalyst may be used since the use of a neutral salt does not require these steps.

The neutral salt for use in one or more embodiments of the present invention is a normal salt including a strong acid and a strong base. For example, the neutral salt is a salt made of a combination of (i) a cation that is an ion selected from the group consisting of Group 1 element ions, Group 2 element ions, a tetraalkylammonium ion, and a guanidium ion and (ii) an anion that is an ion selected from the group consisting of a sulfate ion, a nitrate ion, a perchlorate ion, and Group 17 element ions except for a fluoride ion.

Example compounds of the neutral salt in one or more embodiments of the present invention include:

lithium chloride, sodium chloride, potassium chloride, rubidium chloride, cesium chloride, francium chloride, berylium chloride, magnesium chloride, calcium chloride, strontium chloride, barium chloride, radium chloride, tetramethylammonium chloride, tetraethylammonium chloride, tetrapropylammonium chloride, tetrabutylammonium chloride, tetrapentylammonium chloride, tetrahexylammonium chloride, and guanidium chloride;

lithium bromide, sodium bromide, potassium bromide, rubidium bromide, cesium bromide, francium bromide, berylium bromide, magnesium bromide, calcium bromide, strontium bromide, barium bromide, radium bromide, tetramethylammonium bromide, tetraethylammonium bromide, tetrapropylammonium bromide, tetrabutylammonium bromide, tetrapentylammonium bromide, tetrahexylammonium bromide, and guanidium bromide;

lithium iodide, sodium iodide, potassium iodide, rubidium iodide, cesium iodide, francium iodide, berylium iodide, magnesium iodide, calcium iodide, strontium iodide, barium iodide, radium iodide, tetramethylammonium iodide, tetraethylammonium iodide, tetrapropylammonium iodide, tetrabutylammonium iodide, tetrapentylammonium iodide, tetrahexylammonium iodide, and guanidium iodide;

lithium sulfate, sodium sulfate, potassium sulfate, rubidium sulfate, cesium sulfate, francium sulfate, berylium sulfate, magnesium sulfate, calcium sulfate, strontium sulfate, barium sulfate, radium sulfate, tetramethylammonium sulfate, tetraethylammonium sulfate, tetrapropylammonium sulfate, tetrabutylammonium sulfate, tetrapentylammonium sulfate, tetrahexylammonium sulfate, and guanidium sulfate;

lithium nitrate, sodium nitrate, potassium nitrate, rubidium nitrate, cesium nitrate, francium nitrate, berylium nitrate, magnesium nitrate, calcium nitrate, strontium nitrate, barium nitrate, radium nitrate, tetramethylammonium nitrate, tetraethylammonium nitrate, tetrapropylammonium nitrate, tetrabutylammonium nitrate, tetrapentylammonium nitrate, tetrahexylammonium nitrate, and guanidium nitrate;

lithium perchlorate, sodium perchlorate, potassium perchlorate, rubidium perchlorate, cesium perchlorate, francium perchlorate, berylium perchlorate, magnesium perchlorate, calcium perchlorate, strontium perchlorate, barium perchlorate, radium perchlorate, tetramethylammonium perchlorate, tetraethylammonium perchlorate, tetrapropylammonium perchlorate, tetrabutylammonium perchlorate, tetrapentylammonium perchlorate, tetrahexylammonium perchlorate, and guanidium perchlorate; and the like. These neutral salts can be each used alone or in combination or two or more kinds.

In one or more embodiments, among the above neutral salts, in view of use as a catalyst, the Group 17 element ions that are highly nucleophilic are more preferable as the anion. Meanwhile, the Group 1 element ions and the Group 2 element ions are more preferable as the cation, since the cation is required not to be bulky so that a nucleophilic action of the anion will not be inhibited. Further, in view of availability and safety in handling, the neutral salt is particularly preferably lithium chloride, sodium chloride, potassium chloride, rubidium chloride, cesium chloride, magnesium chloride, calcium chloride, strontium chloride, lithium bromide, sodium bromide, potassium bromide, rubidium bromide, cesium bromide, magnesium bromide, calcium bromide, strontium bromide, lithium iodide, sodium iodide, potassium iodide, rubidium iodide, cesium iodide, magnesium iodide, calcium iodide, or strontium iodide.

In one or more embodiments of the present invention, as the amount of the neutral salt used increases, the hydrolysis and condensation reaction of the silane compounds will be accelerated more. However, in view of transparency and a purification step of the condensation product, a smaller amount of the neutral salt added (the amount of the neutral salt used) is more preferable.

The amount of the neutral salt used in one or more embodiments of the present invention is preferably 0.000001 moles or more and 0.1 moles or less, more preferably 0.000001 moles or more and 0.01 moles or less, particularly preferably 0.000005 moles or more and 0.05 moles or less, and most preferably 0.000005 moles or more and 0.01 moles or less, with respect to 1 mole of the hydrolyzable silyl groups of the silane compounds.

In production of the condensation product (A) in accordance with one or more embodiments of the present invention, the amount of water necessary for hydrolysis and condensation reaction is preferably 0.4 equivalents to 20 equivalents, more preferably 0.45 equivalents to 3 equivalents, and further preferably 0.45 equivalents to 2 equivalents, with respect to $OR^3$ groups directly bonded to the silicon atoms.

In a case where the amount of water is less than 0.4 equivalents, part of the $OR^3$ groups may not be hydrolyzed and remain. In a case where the amount of water is more than 20 equivalents, the rate of the hydrolysis and condensation reaction is so high that a condensation product having a large molecular weight is produced. This may result in deterioration of physical properties and transparency of the coating film.

In production of the condensation product (A) in accordance with one or more embodiments of the present invention, in view of safety in production, a diluting solvent, an alcohol generated in hydrolysis, etc. are preferably refluxed during production.

The diluting solvent used in the production of the condensation product (A) in one or more embodiments of the present invention indicates an alcohol or ether compound. Further, the diluting solvent is preferably water-soluble.

This is because since the silane compounds (I) and (II) used in one or more embodiments of the present invention each often have low compatibility with a neutral salt and/or water that are to be used in hydrolysis, reaction solution is preferably a solution which has high compatibility with the silane compounds, in view of a smooth progress of reaction.

On the other hand, ketone and ester solvents each have a carbonyl group and tend to inhibit reaction. Therefore, ketone and ester solvents are not suitable for the diluting solvent.

A boiling point of the diluting solvent for use in production of the condensation product (A) in accordance with one or more embodiments of the present invention is preferably 40° C. or higher and 200° C. or lower, more preferably 50° C. or higher and 200° C. or lower, still more preferably 60° C. or higher and 250° C. or lower, and particularly preferably 60° C. or higher and 230° C. or lower.

In a case where the boiling point of the diluting solvent is less than 40° C., the diluting solvent tends to be refluxed at a low temperature and inhibit reaction. On the other hand, in a case where the boiling point of the diluting solvent is higher than 200° C., the boiling point is so high that it will be difficult to remove the diluting solvent after reaction. Accordingly, in such a case, it may be required to incorporate a complicated process such as extraction by separation.

Examples of the diluting solvent for use in production of the condensation product (A) in one or more embodiments of the present invention include methanol, ethanol, 1-propanol, 2-propanol, 2-butanol, 2-methyl-2-propanol, 1-methoxy-2-propanol, ethylene glycol monomethyl ether, ethylene glycol dimethyl ether, propylene glycol monomethyl ether, propylene glycol dimethyl ether, and the like. These diluting solvents can be each used alone or in combination of two or more kinds.

The amount of the diluting solvent used in one or more embodiments of the present invention is defined as a total amount of water and the diluting solvent. The total amount of the silane compounds (I) and (II) with respect to the total amount of the silane compounds (I) and (II), water, and the diluting solvent is preferably 20 mass % or more and 90 mass % or less, more preferably 30 mass % or more and 80 mass % or less, and particularly preferably 40 mass % or more and 80 mass % or less.

In a case where the amount of the diluting solvent used is too large, there is a concern that the concentration of the silane compounds may decrease in a reaction system and that this may consequently decrease a reaction rate. On the other hand, a large amount of the diluting solvent used can be expected to bring about an effect of improving the compatibility of water and the silane compounds and an effect of inhibiting a decrease in reaction rate by suppressing a viscosity increase in the system, which viscosity increase occurs as reaction progresses. Therefore, it is important to choose a suitable amount of the diluting solvent.

In production of the condensation product (A) in accordance with one or more embodiments of the present invention, a reaction temperature is preferably in a range of 40° C. to 200° C., more preferably in a range of 50° C. to 250° C., and further preferably in a range of 60° C. to 230° C.

In a case where the reaction temperature is lower than 40° C., catalyst activity of the neutral salt decreases and accordingly, a reaction time tends to significantly increase. On the other hand, in a case where the reaction temperature is higher than 200° C., there is a concern about side reaction and consequent deactivation of an organic substituent.

<(B) Curing Agent which Cures Epoxy Group>

A curing agent for use in an epoxy resin composition in accordance with one or more embodiments of the present invention, that is, the curing agent (B) contained in the curable composition is not particularly limited. The curing agent can be any generally known epoxy resin curing agent.

In one or more embodiments, preferred examples of the curing agent include acid anhydride curing agents, cationic polymerization initiators, organic phosphorous compounds, amine curing agents, tertiary amines, and the like.

In one or more embodiments, in a case where the curing agent (B) is a curing agent which promotes polymerization of the epoxy group in the condensation product (A) (curing agent which polymerizes the epoxy group; hereinafter, also referred to as a "polymerization-type curing agent"), the content of the curing agent (B) in the curable composition is preferably 0.5 parts by weight to 10 parts by weight and more preferably 0.5 parts by weight to 5 parts by weight, with respect to 100 parts by weight of the condensation product (A).

In a case where the amount of the curing agent (polymerization-type curing agent) which is used for promotion of polymerization of the epoxy group is less than 0.5 parts by weight with respect to 100 parts by weight of the condensation product (A), the polymerization of the epoxy group may not sufficiently progress. On the other hand, in a case where the amount of the curing agent used is more than 10 parts by weight, the number of polymerization starting points increases, so that the polymerization of the epoxy group may not sufficiently progress. Further, in a case where the amount of the curing agent used is more than 10 parts by weight with respect to 100 parts by weight of the condensation product (A), the curing agent may not act as a polymerization starting point and consequently remain as a plasticizer in a coating film.

In one or more embodiments, in a case where the curing agent (B) is a curing agent which has active hydrogen and which carries out addition reaction with the epoxy group in the condensation product (A) (hereinafter, such a curing agent may also be referred to as "addition-type curing agent"), that is, in a case where the curing agent (B) is a curing agent which cures the epoxy group by addition of the curing agent (B) to the epoxy group, the content of the curing agent (B) in the curable composition is preferably 10 parts by weight to 150 parts by weight, and more preferably 30 parts by weight to 150 parts by weight, with respect to 100 parts by weight of the condensation product (A).

In a case where the amount of the curing agent (addition-type curing agent) mixed, which curing agent carries out addition reaction with the epoxy group, is less than 10 parts by weight with respect to 100 parts by weight of the condensation product (A), the epoxy group may not be cured sufficiently. On the other hand, in a case where the amount of the curing agent is more than 150 parts by weight, the curing agent is excessive in amount. Accordingly, though crosslinking of the epoxy group sufficiently progresses, the curing agent (B) remaining becomes a plasticizer, so that a crosslink density may not be sufficiently high.

The following describes details of an acid anhydride curing agent, a cationic polymerization initiator, an organic phosphorous compound, and other usable curing agents.

(b-1) Acid Anhydride Curing Agent

In view of heat resistance, the curing agent which cures the epoxy group in one or more embodiments of the present invention is preferably an acid anhydride curing agent. Note that acid anhydride curing agents are classified into a curing agent of a complex type of the above polymerization type and the above addition type.

Examples of the acid anhydride curing agent include phthalic anhydride, trimellitic anhydride, pyromellitic anhydride, benzophenone tetracarboxylic anhydride, dodecenyl succinic anhydride, polyadipic anhydride, polyazelaic anhydride, polysebacic anhydride, poly(ethyloctadecane diacid) anhydride, poly(phenylhexadecane diacid)anhydride, tetrahydrophthalic anhydride, methyltetrahydrophthalic anhydride, methylhexahydrophthalic anhydride, hexahydrophthalic anhydride, methyl himic anhydride, tetrahydrophthalic anhydride, trialkyltetrahydrophthalic anhydride, methylcyclohexene dicarboxylic anhydride, methylcyclohexene tetracarboxylic anhydride, ethyleneglycol bis-trimellitate dianhydride, HET anhydride, nadic anhydride, methylnadic anhydride, 5-(2,5-dioxotetrahydro-3-furanyl)-3-methyl-3-cyclohexane-1,2-dicarboxylic anhydride, 3,4-dicarboxy-1,2,3,4-tetrahydro-1-naphthalene succinic dianhydride, 1-methyl-dicarboxy-1,2,3,4-tetrahydro-1-naphthalene succinic dianhydride, and the like.

The above acid anhydride curing agents can be used each alone or in any combination of two or more kinds each mixed in any amount.

In one or more embodiments, in a case where such an acid anhydride curing agent is used, an equivalent ratio of a functional group in the curing agent with respect to the epoxy group in the condensation product (A) is arranged to be preferably in a range of 0.5 to 10. The equivalent ratio in a range of 0.5 to 110 is preferable because an unreacted epoxy group and/or an unreacted functional group of the curing agent is/are unlikely to remain at such an equivalent ratio.

(b-2) Cationic Polymerization Initiator

In view of physical properties (e.g., abrasion resistance, chemical resistance, etc.) of a resultant cured product, the curing agent which cures the epoxy group in one or more embodiments of the present invention is preferably a cationic polymerization initiator. Note that the cationic polymerization initiator is classified into the polymerization-type curing agent.

Examples of the cationic polymerization initiator include a thermal initiator for cationic polymerization, a photo initiator for cationic polymerization, and the like. The thermal initiator for cationic polymerization forms cationic species and/or Lewis acid by heat, while the photo initiator for cationic polymerization forms cationic species and/or Lewis acid by light. Note that there is no clear distinction between the thermal initiator for cationic polymerization and the photo initiator for cationic polymerization, and there are cationic polymerization initiators which can act as a curing agent by both light and heat. In one or more embodiments, a cationic polymerization initiator which carries out cationic polymerization of the epoxy group and forms cationic species and/or Lewis acid is also referred to as an acid-forming agent. In one or more embodiments of the present invention, the curing agent (B) can be such an acid-forming agent that can carry out cationic polymerization of the epoxy group.

Examples of the thermal initiator for cationic polymerization include onium-salt cationic polymerization initiators such as a diazonium salt, a sulfonium salt, an ammonium salt, a pyridinium salt, a phosphonium salt, and an iodonium salt; aluminum-complex cationic polymerization initiators such as a combination of an aluminum complex and a silanol compound, and a combination of an aluminum complex and bisphenol S; and the like.

Examples of the thermal initiator for cationic polymerization include diphenyliodonium-hexafluorophosphate, diphenyliodonium-hexafluoroantimonate, diphenyliodonium-trispentafluorophenyl borate, triphenylsulfonium-hexafluorophosphate, triphenylsulfonium-hexafluoroantimonate, triphenylsulfonium-trispentafluorophenyl borate, aluminum triisopropoxide, aluminum trisecondarybutoxide, aluminum ethylacetoacetate-diisopropylate, aluminum trisethylacetoacetate, aluminum alkylacetoacetate-diisopropylate, aluminum bisethylacetoacetate-monoacetylacetonate, aluminum trisacetylacetonate, and the like.

Examples of the photo initiator for cationic polymerization include an aromatic diazonium salt, an aromatic sulfonium salt, an aromatic iodonium salt, and the like. The photo initiator for cationic polymerization falls under the curing agent which cures the epoxy group in the curable composition being irradiated with an active energy ray.

Examples of the photo initiator for cationic polymerization include diphenyliodonium-hexafluorophosphate, diphenyliodonium-hexafluoroantimonate, diphenyliodonium-trispentafluorophenyl borate, triphenylsulfonium-hexafluorophosphate, triphenylsulfonium-hexafluoroantimonate, triphenylsulfonium-trispentafluorophenyl borate, bis(tertiary butylsulfonyl) diazomethane, and the like.

The cationic polymerization initiator is available as a marketed product. Examples of such a cationic polymerization initiator include: FC-520 manufactured by 3M Company, UVR-6990 and UVR-6974 manufactured by Union Carbide Corporation, UVE-1014 and UVE-1016 manufactured by General Electric Company, KI-85 manufactured by Degussa AG, SP-15 and SP-170 manufactured by Asahi Denka Co., Ltd., and SI-60L, SI-80L and SI-100L manufactured by Sanshin Chemical Industry Co., Ltd. (these products are thermal initiators for cationic polymerization); CPI-100P, CPI-101A, CPI-200K and CPI-200S manufactured by San-Apro Ltd., WPI-124, WPI-113, WPI-116, WPI-169, WPI-170 and WPI-124 manufactured by Wako Pure Chemical Industries Ltd., and Rhodorsil 2074 manufactured by Rhodia Inc. (these products are photo initiators for cationic polymerization); and the like.

In one or more embodiments, among the above cationic polymerization initiators, onium salts are preferable in view of handleability. Further, among the onium salts, a diazonium salt, an iodonium salt, a sulfonium salt, and phosphonium salt are particularly preferable.

In one or more embodiments, the curing agent (B) that is a cationic polymerization initiator is preferably a compound which contains at least one selected from the group consisting of a triphenylsulfonium group, a diphenylsulfonium group, and a diphenyliodonium group, because such a compound has excellent solubility in an organic resin/solvent and/or excellent ultraviolet absorptivity. Examples of the compound include diphenyl[4-(phenylthio)phenyl] sulfonium hexafluoroantimonate, diphenyl[4-(phenylthio)phenyl] sulfonium hexafluorophosphate, and the like.

The above-described cationic polymerization initiators can be used each alone or in any combination of two or more kinds each mixed in any amount.

In one or more embodiments, the amount of the cationic polymerization initiator added needs to be adjusted in accordance with an amount of generated acid and a rate of generation of the acid. However, in one or more embodiments, the amount of the cationic polymerization initiator added is preferably 0.5 parts by weight to 10 parts by weight and more preferably 0.5 parts by weight to 5 parts by weight, with respect to 100 parts by weight of the condensation product (A) (solid content).

In one or more embodiments, in a case where the amount of the cationic polymerization initiator added is in a range of 0.01 parts by weight to 10 parts by weight with respect to 100 parts by weight of the condensation product (A) (solid content), an epoxy resin cured product has preferable abrasion resistance and chemical resistance. Accordingly, in one or more embodiments, the amount of the cationic polymerization initiator added is preferably in the range of 0.01 parts by weight to 10 parts by weight.

Further, in a case where curing is carried out by cationic ring-opening polymerization with use of a very strong acid such as a fluorophosphate-based acid, a fluoroantimonate-based acid or a fluoroborate-based acid, polymerization of the epoxy group rapidly progresses due to high acidity of such an acid. This makes it possible to obtain a cured product having high abrasion resistance and high chemical resistance. Further, specific setting expansion may occur.

(b-3) Organic Phosphorous Compound

The curing agent which cures the epoxy group in one or more embodiments of the present invention is preferably an organic phosphorous compound, in view of acceleration of curing reaction. Note that the organic phosphorous compound is classified into the polymerization-type curing agent.

Examples of the organic phosphorous compound include: organic phosphines such as tributylphosphine, methyldiphenyl phosphine, triphenyl phosphine, diphenyl phosphine, and phenyl phosphine; phosphonium salts such as methyltributyl phosphonium dimethylphosphate, tetraphenyl phosphonium-tetraphenyl borate, tetraphenyl phosphonium-ethyltriphenyl borate, tetrabutyl phosphonium-tetrabutyl borate; and the like.

The above organic phosphorous compounds can be used each alone or in any combination of two or more kinds each mixed in any amount.

In one or more embodiments, the amount of the organic phosphorous compound added needs to be adjusted in accordance with an amount of generated acid and a rate of generation of the acid. However, in one or more embodiments, the amount of the organic phosphorous compound added is preferably 0.5 parts by weight to 10 parts by weight and more preferably 0.5 parts by weight to 5 parts by weight, with respect to 100 parts by weight of the condensation product (A) (solid content).

(b-4) Amine Curing Agent

The curing agent which cures the epoxy group in one or more embodiments of the present invention is preferably an amine curing agent (note that tertiary amine is excluded), in view of availability and cost. Note that the amine curing agent is classified into the addition-type curing agent.

Examples of the amine curing agent (note that tertiary amine is excluded) include aliphatic amines, polyether amines, alicyclic amines, aromatic amines, and the like.

Examples of the aliphatic amines include ethylenediamine, 1,3-diaminopropane, 1,4-diaminopropane, hexamethylenediamine, 2,5-dimethylhexamethylenediamine, trimethylhexamethylenediamine, diethylenetriamine, iminobispropylamine, bis(hexamethylene)triamine, triethylenetetramine, tetraethylenepentamine, pentaethylenehexamine, N-hydroxyethylethylenediamine, tetra(hydroxyethyl) ethylenediamine, and the like.

Examples of the polyether amines include triethyleneglycoldiamines, tetraethyleneglycoldiamines, diethyleneglycol-bis(propylamines), polyoxypropylenediamines, polyoxypropylenetriamines, and the like.

Examples of the alicyclic amines include isophoronediamine, menthene diamine, N-aminoethylpiperazine, bis(4-amino-3-methyldicyclohexyl)methane, bis(aminomethyl)cyclohexane, 3,9-bis(3-aminopropyl)-2,4,8,10-tetraoxaspiro (5,5)undecane, norbornenediamine, and the like.

Examples of the aromatic amines include tetrachloro-p-xylenediamine, m-xylenediamine, p-xylenediamine, m-phenylenediamine, o-phenylenediamine, p-phenylenediamine, 2,4-diaminoanisole, 2,4-toluenediamine, 2,4-diaminodiphenylmethane, 4,4'-diaminodiphenylmethane, 4,4'-diamino-1,2-diphenylethane, 2,4-diaminodiphenylsulfone, 4,4'-diaminodiphenylsulfone, m-aminophenol, m-aminobenzylamine, benzyldimethylamine, 2-dimethylaminomethylphenol, triethanolamine, methylbenzylamine, α-(m-aminophenyl)ethylamine, α-(p-aminophenyl)ethylamine, diaminodiethyldimethyl diphenylmethane, α,α'-bis(4-aminophenyl)-p-diisopropylbenzene, and the like.

These amine curing agents can be used each alone or in any combination of two or more kinds each mixed in any amount.

In one or more embodiments, the amount of the amine curing agent is preferably 10 parts by weight to 150 parts by weight and more preferably 30 parts by weight to 150 parts by weight, with respect to 100 parts by weight of the condensation product (A) (solid content).

(b-5) Tertiary Amine

The curing agent which cures the epoxy group in one or more embodiments of the present invention is preferably a tertiary amine, in view of availability and cost. Note that the tertiary amine curing agent is classified into the polymerization-type curing agent.

Examples of the tertiary amine include 1,8-diazabicyclo (5,4,0)undecene-7, triethylenediamine, benzyldimethylamine, triethanolamine, dimethylaminoethanol, tris(dimethylaminomethyl)phenol, and the like.

These tertiary amines can be used each alone or in any combination of two or more kinds each mixed in any amount.

In one or more embodiments, the amount of the tertiary amine is preferably 0.5 parts by weight to 10 parts by weight and more preferably 0.5 parts by weight to 5 parts by weight, with respect to 100 parts by weight of the condensation product (A) (solid content).

(b-6) Other Curing Agents

The curing agent which cures the epoxy group in one or more embodiments of the present invention can be, for example, any of an acid anhydride curing agent, a cationic polymerization initiator, an organic phosphorous compound, an amine curing agent (note that tertiary amine is excluded), a tertiary amine, etc. Examples of curing agents other than the above include amide curing agents, phenol curing agents, imidazoles, tetraphenylboron salts, organic acid dihydrazides, boron halide amine complexes, polymercaptan curing agents, isocyanate curing agents, blocked isocyanate curing agents, and the like.

These other curing agents can be used each alone or in any combination of two or more kinds each mixed in any amount.

<(C) Metal-Oxide-Fine-Particles>

In a curable composition, in accordance with one or more embodiments of the present invention, in which an epoxysilane condensation product is used, metal-oxide-fine-particles (C) can be used as necessary. Mixing the metal-oxide-fine-particles (C) may result in further improvement of abrasion resistance of a coating film.

Examples of the metal-oxide-fine-particles (C) include fine particles made of silica ($SiO_2$), alumina ($Al_2O_3$), tin oxide ($SnO_2$), zirconia ($ZrO_2$), zinc oxide (ZnO), titania ($TiO_2$), ITO (indium tin oxide), and antimony oxide ($Sb_2O_3$, $Sb_2O_5$), composite fine particles made of these metals, and the like.

In one or more embodiments, among the above, silica, alumina, zirconia and antimony oxide are preferable in view of high hardness. In particular, in view of availability, cost, surface hardness, and the like, silica fine particles and alumina fine particles are preferable. Further, silica fine particles are particularly preferable. These metal-oxide-fine-particles can be used each alone or in combination of two or more kinds.

In one or more embodiments, such metal-oxide-fine-particles (C) are preferably in the form of powder or solvent dispersion sol. In a case where the metal-oxide-fine-particles (C) are in the form of solvent dispersion sol, a dispersion medium is preferably an organic solvent in view of compatibility with other component(s) and dispersibility. Examples of such an organic solvent include: alcohols such as methanol, ethanol, isopropanol, butanol, and octanol; ketones such as acetone, methyl ethyl ketone, methyl isobutyl ketone, and cyclohexanone; esters such as ethyl acetate, butyl acetate, ethyl lactate, and δ-butyrolactone; ethers such as ethylene glycol monomethyl ether, and diethylene glycol monobutyl ether; aromatic hydrocarbons such as benzene, toluene, and xylene; and amides such as dimethylformamide, dimethylacetamide, and N-methylpyrrolidone. In one or more embodiments, among the above organic solvents, alcohols, methyl ethyl ketone, methyl isobutyl ketone, ethyl acetate, and butyl acetate are preferable.

In one or more embodiments, the average particle diameter (average primary particle diameter) of the metal-oxide-fine-particles (C) is preferably 100 nm or less, more preferably 40 nm or less, and particularly preferably 20 nm or less. When the average particle diameter of the metal-oxide-fine-particles (C) is larger than 100 nm, transparency of a resultant coating film tends to be impaired. Note that the average particle diameter can be measured by the BET adsorption method according to JIS Z 8330:2013.

Examples of a commercially available dispersion of silica fine particles, for example, in the form of colloidal silica include methanol silica sol, IPA-ST, MEK-ST, NBA-ST, XBA-ST, DMAC-ST, MIBK-ST, ST-UP, ST-OUP, ST-20, ST-40, ST-C, ST-N, ST-O, ST-50, ST-OL, etc. (which are manufactured by Nissan Chemical Industries, Ltd.); OSCAL series and ELECOM series (which are manufactured by JGC Catalysts and Chemicals Ltd.); and the like.

Examples of commercially available powder silica include AEROSIL 130, AEROSIL 300, AEROSIL 380, AEROSIL TT600, AEROSIL OX50, etc. (which are manufactured by Nippon AEROSIL CO., LTD); SILDEX H31, H32, H51, H52, H121, H122, etc. (which are manufactured by Asahi Glass Co., Ltd.); E220A, E220, etc. (which are manufactured by Nippon Silica Industrial Co., Ltd.); SYLYSIA 470 (manufactured by Fuji Silysia Chemical Ltd.); SG Flake (manufactured by Nippon Sheet Glass Co., Ltd.); and the like.

Examples of a commercially available dispersion of alumina fine particles include NANOBYK-3601, NANOBYK-3602, NANOBYK-3610, etc. (which are manufactured by BYK JAPAN KK). A commercially available dispersion of alumina in isopropanol is, for example, AS-150I or the like (manufactured by Sumitomo Osaka Cement Co., Ltd.). A commercially available dispersion of alumina in toluene is, for example, AS-150T (manufactured by Sumitomo Osaka Cement Co., Ltd.). A commercially available dispersion of zirconia in toluene is, for example, HXU-110JC (manufactured by Sumitomo Osaka Cement Co., Ltd.). Further, an example of a commercially available powder of alumina, titania, tin oxide, indium oxide, zinc oxide or the like and a commercially available dispersion of the powder in solvent is a product named NanoTek (manufactured by C.I. Kasei Co., Ltd.), or the like.

In one or more embodiments, among the above, ELECOM V-8802 and ELECOM V-8804 (which are manufactured by JGC Catalysts and Chemicals Ltd.) are preferable, since fine particles are highly dispersible in a coating fluid and as a result, transparency, hardness, and abrasion resistance of a resultant coating film is further improved.

In one or more embodiments, the amount of the metal-oxide-fine-particles (C) used is preferably 0 parts by weight to 100 parts by weight and further preferably 0 parts by weight to 50 parts by weight, with respect to 100 parts by weight of the condensation product (A). In a case where the amount of the metal-oxide-fine-particles (C) used is larger than 100 parts by weight, a coating film may not be formed or transparency of the coating film may deteriorate. Since the metal-oxide-fine-particles (C) has no adverse effect on strength of the coating film, there is no problem in coexistence of the condensation product (A) and the metal-oxide-fine-particles (C).

In one or more embodiments, in view of adhesiveness with a base material, the total solid content concentration of the condensation product (A) and the metal-oxide-fine-particles (C) is preferably 30% by weight or more and 80% by weight or less, more preferably 40% by weight or more and 80% by weight or less, still more preferably 50% by weight or more and 80% by weight or less, and particularly preferably 60% by weight or more and 80% by weight or less, with respect to a solid content weight (100% by weight) of the curable composition in accordance with one or more embodiments of the present invention. In a case where the total solid content concentration of the condensation product (A) and the metal-oxide-fine-particles (C) is in a range of 30% by weight or more and 80% by weight or less, adhesiveness between a resultant coating film and a base material is improved.

<Photosensitizer (D)>

In a case where the curing agent (B) is a photo-acid-forming agent in the curable composition in accordance with one or more embodiments of the present invention, a photosensitizer (D) can be used as necessary for the purpose of improving photosensitivity of the photo-acid-forming agent. The photosensitizer (D) is more efficient when the photosensitizer (D) is capable of absorbing light in a wavelength range which light cannot be absorbed by the photo-acid-forming agent used. Therefore, in one or more embodiments, the photosensitizer (D) is preferably a photosensitizer having an absorption wavelength range which less overlaps with that of the photo-acid-forming agent.

The photosensitizer (D) is not specifically limited. Examples of the photosensitizer (D) include an anthracene derivative, a benzophenone derivative, a thioxanthone derivative, an anthraquinone derivative, a benzoin derivative, and the like.

An ideal photosensitizer has a low oxidation potential, and a high excitation energy in a singlet state or a triplet state relevant to electron transfer. Accordingly, in one or more embodiments, in view of a photo-induced electron donating characteristic, an anthracene derivative, a thioxanthone derivative and a benzophenone derivative are preferable among the above photosensitizers.

Examples of such photosensitizers include 9,10-dialkoxy-anthracene, 2-alkylthioxanthone, 2,4-dialkylthioxanthone, 2-alkylanthraquinone, 2,4-dialkylanthraquinone, p,p'-aminobenzophenone, 2-hydroxy-4-alkoxybenzophenone, benzoin ether, and the like.

Further, concretely, examples of the photosensitizers include anthrone, anthracene, 9,10-diphenyl anthracene, 9-ethoxyanthracene, pyrene, perylene, coronene, phenanthrene, benzophenone, benzyl, benzoin, methyl 2-benzoylbenzoate, butyl 2-benzoylbenzoate, benzoinethyl ether, benzoin-i-butyl ether, 9-fluorenone, acetophenone, p,p'-tetramethyldiamino benzophenone, p,p'-tetraethylamino benzophenone, 2-chlorothioxanthone, 2-isopropylthioxanthone, 2,4-diethylthioxanthone, phenothiazine, acridine orange, benzoflavin, setoflavine-T, 2-nitrofluorene, 5-nitroacenaphthene, benzoquinone, 2-chloro-4-nitroaniline, N-acetyl-p-nitroaniline, p-nitroaniline, N-acetyl-4-nitro-1-naphthylamine, picramide, anthraquinone, 2-ethylanthraquinone, 2-tert-butylanthraquinone, 1,2-benzanthraquinone, 3-methyl-1,3-diaza-1,9-benzanthrone, dibenzalacetone, 1,2-naphthoquinone, 3,3'-carbonyl-bis(5,7-dimethoxycarbonyl-coumalin), 9,10-dibutoxyanthracene, 9,10-dipropoxyanthracene, and the like. The above photosensitizers can be used each alone or in combination of two or more kinds.

In a case where the photosensitizer (D) is used, the amount of the photosensitizer (D) added should be adjusted as appropriate in accordance with a target curing rate. In one or more embodiments, the amount of the photosensitizer (D) added is preferably 0.1 parts by weight or more, more preferably 0.5 parts by weight or more, and also preferably 10 parts by weight or less and more preferably 5 parts by weight or less, with respect to 100 parts by weight of the photo-acid-forming agent.

When the amount of the photosensitizer (D) added is less than 0.1 parts by weight, a target effect of the photosensitizer is unlikely to be obtained. On the other hand, an amount of more than 10 parts by weight of the photosensitizer (D) added tends to result in coloring of a coating film and/or an increase in cost.

<Curable Composition>

The curable composition in accordance with one or more embodiments of the present invention contains the above components (A) and (B) and if necessary, the above components (C) and (D). Further, various kinds of additives can be mixed so as to adjust physical properties. It is possible to add an additive(s) which is/are generally used in coating materials. Examples of such an additive(s) include an inorganic filler, an inorganic pigment/organic pigment, a plasticizer, a disperser, a wetter, a thickener, a defoaming agent, and/or the like.

The inorganic filler can be various fillers. Examples of the inorganic filler include silica inorganic fillers such as quartz, fumed silica, precipitated silica, silicic anhydride, molten silica, crystalline silica, and ultrafine powder amorphous silica; inorganic fillers each generally used or/and proposed as a filling material for a conventional sealing material such as an epoxy sealing material; and the like. The inorganic fillers each generally used or/and proposed as a filling material for a conventional sealing material include alumina, zircon, titanium oxide, zinc oxide, silicon nitride, boron nitride, aluminum nitride, silicon carbide, glass fiber, alumina fiber, carbon fiber, mica, black lead, carbon black, graphite, diatomaceous earth, terra alba, clay, talc, aluminum hydroxide, calcium carbonate, magnesium carbonate, barium sulfate, potassium titanate, calcium silicate, inorganic balloon, silver powder, and the like.

In a case where the curable composition or the cured product in accordance with one or more embodiments of the present invention is used as a reflector a reflective plate, or the like for a light-emitting diode, white filler is preferably titanium oxide or zinc oxide and black filler is preferably black lead, carbon black, or graphite.

Further, in a case where the curable composition or the cured product is used as a reflector for a light-emitting diode, it is better to arrange such that the linear expansion coefficient of the curable composition or the cured product is equal to the linear expansion coefficient of the inorganic filler, in view of ensured adhesive property with a lead frame (lead frames made of silver-plated copper are largely used), warpage prevention, and internal stress reduction. On this account, in one or more embodiments, use of silicas in combination is preferable.

The inorganic filler can be surface-treated as appropriate. Examples of a method for such surface-treating include alkylation treatment, trimethylsilylation treatment, silicone treatment, treatment with a coupling agent, and the like.

An example of the coupling agent is a silane coupling agent. The silane coupling agent is not specifically limited and can be any compound having, in a molecule, at least one hydrolyzable silicon group and at least one functional group that is reactive with an organic group. In one or more embodiments, the group reactive with an organic group is preferably at least one functional group selected from an epoxy group, a methacryl group, an acryl group, an isocyanate group, an isocyanurate group, a vinyl group, or a carbamate group, in view of handleability. Further, in view of hardness and adhesive property, the group reactive with an organic group is particularly preferably an epoxy group, a methacryl group, or an acryl group. Meanwhile, the hydrolysable silicon group is preferably an alkoxysilyl group, in view of handleability, and particularly preferably a methoxysilyl group or an ethoxysilyl group, in view of reactivity.

Examples of a preferable silane coupling agent include: alkoxysilanes having an epoxy functional group, such as 3-glycidoxypropyl trimethoxysilane, 3-glycidoxypropyl triethoxysilane, 2-(3,4-epoxycyclohexyl)ethyl trimethoxysilane, and 2-(3,4-epoxycyclohexyl)ethyl triethoxysilane; and alkoxysilanes having a methacryl group or an acryl group, such as 3-methacryloxypropyl trimethoxysilane, 3-methacryloxypropyl triethoxysilane, 3-acryloxypropyl trimethoxysilane, 3-acryloxypropyl triethoxysilane, methacryloxymethyl trimethoxysilane, methacryloxymethyl triethoxysilane, acryloxymethyl trimethoxysilane, and acryloxymethyl triethoxysilane.

In a composition curable with an active energy ray in accordance with one or more embodiments of the present invention, a solvent can be mixed. The solvent is not specifically limited. However, in one or more embodiments, in a case where a base material to be used is made of plastic, the solvent according to one or more embodiments is preferably any of ketones such as methyl isobutyl ketone and diisobutyl ketone, alcohols such as butanol and isopropyl alcohol, esters such as butyl acetate and isopropyl acetate, ethers such as diethylene glycol methyl ether and propylene glycol methyl ether. This is because in a case where the base material is made of plastic, the base material often has low solvent resistance. In one or more embodiments, it is particularly preferable to use 30% by weight or more of an ether solvent with respect to an entire solvent, in view of prevention of damage to the base material.

In one or more embodiments, the amount of the solvent mixed is preferably 0 parts by weight to 300 parts by weight, and more preferably 0 parts by weight to 150 parts by weight, with respect to the total amount (100 parts by weight) of the above components (A) to (D). In a case where the amount of the solvent mixed is larger than 300 parts by weight, the base material may be damaged as described above. Therefore, in one or more embodiments, the amount of the solvent mixed over 300 parts by weight solvent is not preferable.

A method for preparing the composition curable with an active energy ray in accordance with one or more embodiments of the present invention is not specifically limited. The method can be, for example, a conventional method such as (i) a method including mingling the above components and then mixing the above components by use of a hand mixer or a static mixer, if necessary, in a condition where light is blocked, (ii) a method including kneading at normal temperature or under heating by use of a planetary mixer, a dispersion mixer, a roller, a kneader, or the like, (iii)

a method including dissolving and mixing the above components in a small amount of a suitable solvent, or the like method.

<Cured Product>

The cured product in accordance with one or more embodiments of the present invention includes a product which can be obtained by curing the composition curable with an active energy ray. In other words, the cured product is a product obtained by curing the curable composition.

Examples of the active energy ray used for irradiation in curing include visible light, ultraviolet light, infrared light, X-ray, α-ray, β-ray, δ-ray, and the like. In one or more embodiments, in view of a high reaction rate and relatively low cost of an active energy ray generation device, the active energy ray is most preferably ultraviolet light.

In one or more embodiments, the amount of the active energy ray for irradiation in accumulated amount of light is preferably 50 mJ/cm$^2$ to 10,000 mJ/cm$^2$ and more preferably 100 mJ/cm$^2$ to 2,000 mJ/cm$^2$.

In a case where the amount of the active energy ray for irradiation is less than 50 mJ/cm$^2$, a long time is taken for curing due to a small amount of light. This may result in deterioration of productivity. On the other hand, in a case where the amount of the active energy ray is larger than 10,000 mJ/cm$^2$, the composition may not be cured well or the base material may be damaged.

The cured product in accordance with one or more embodiments of the present invention includes a product obtained by curing a thermosetting composition. In this case, a curing temperature is not specifically limited, and in general, the curing temperature is preferably 200° C. or less, more preferably 150° C. or less, and further preferably 120° C. or less. In a case where the thermosetting composition is cured at a temperature higher than 200° C., there is a concern that an organic component in the condensation product (A) may be decomposed.

The curable composition or the cured product in accordance with one or more embodiments of the present invention can be used for various purposes. The curable composition is applicable to use for the various purposes for which a conventional epoxy resin curable composition is employed.

The curable composition or the cured product in accordance with one or more embodiments of the present invention is applicable to, for example, transparent materials, optical materials, optical lenses, optical films, optical sheets, adhesives for optical components, optical adhesives for coupling optical waveguides, adhesives for fixing peripheral members of an optical waveguide, adhesives for bonding DVDs, pressure sensitive adhesives, dicing tapes, electronic materials, insulating materials (including printed substrates, wire coverings, etc.), high-voltage insulating materials, interlayer dielectric films, insulating packings, insulating coating materials, adhesives, highly-heat-resistant adhesives, high-heat-dissipation adhesives, optical adhesives, adhesives for LED elements, adhesives for various substrates, adhesives for heatsinks, coating materials, UV powder coating materials, inks, colored inks, UV-ink-jet inks, coating materials (including hard coatings, sheets, films, coatings for release paper, coatings for optical disks, coatings for optical fiber, etc.), molding materials (including sheets, films, FRPs, etc.), sealants, potting materials, sealing materials, sealing materials for light-emitting diodes, reflectors/reflective plates for light-emitting diodes, optical semiconductor sealing materials, liquid crystal sealing agents, sealing agents for display devices, sealing materials for electric materials, sealing materials for solar cells, highly-heat-resistant seal materials, resist materials, liquid resist materials, colored resists, dry film resist materials, solder resist materials, color filter materials, optical modeling, electronic paper materials, hologram materials, solar cell materials, fuel cell materials, display materials, recording materials, vibration-proof materials, water-proof materials, moisture-proof materials, heat shrinkable rubber tubes, O-rings, photosensitive drums for copying machines, solid electrolytes for batteries, and gas separation membranes. Further, the curable composition or the cured product in accordance with one or more embodiments of the present invention is also applicable to additives etc. for concrete-protecting materials, linings, injection agents for soil, accumulated heat and cold storage materials, seal materials for sterilization treatment equipment, contact lenses, oxygen enrichment membranes and in addition, other resins, and the like.

<Laminate>

By using the curable composition in accordance with one or more embodiments of the present invention, a laminate can be produced.

The laminate in accordance with one or more embodiments of the present invention can be obtained by a production method including the steps of applying, to a base material, the curable composition; and forming a cured coating by curing the curable composition with an active energy ray and/or with use of a heat source.

In other words, the laminate in accordance with one or more embodiments of the present invention is a product obtained by curing the curable composition which is applied to a surface of the base material.

In one or more embodiments of the present invention, the base material is not specifically limited, and can be any of various base materials described later.

The laminate in accordance with one or more embodiments of the present invention can be suitably used for front plates of personal computers, smartphones, tablets, etc., window glasses of automobiles etc., protective materials for lamps of automobiles etc., films, and the like.

The curable composition in accordance with one or more embodiments of the present invention can be suitably used for coating in, for example, constructions, home appliances, industrial equipment, and the like each made of metal, ceramic, glass, cement, a ceramic base material(s), plastic, film, sheet, wood, paper, fiber, and/or the like. Further, since the cured product in accordance with one or more embodiments of the present invention has low cure shrinkage, the cured product can be more suitably used for a base material (e.g., film or sheet) having low rigidity in view of prevention of warpage of a laminate such as a laminated film, ensured adhesiveness with other members of a laminate such as a laminated film, and an excellent moldability through vacuum molding etc., and the like.

In one or more embodiments, in view of utilizing an advantage that high heat is unnecessary in curing in the case of curing by irradiation with an active energy ray, the base material is preferably a resinous base material. Examples of such a base material include a plastic base material, a film base material, a sheet base material, and the like base material, each of which is made of acrylic resin, polycarbonate resin, polyethylene terephthalate (hereinafter, referred to as "PET") resin, or the like.

Examples of the acrylic resin base material include SUMIPEX and Technolloy (which are manufactured by Sumika Acryl Co., Ltd.), ACRYPLEN and ACRYLITE (which are manufactured by Mitsubishi Rayon Co., Ltd.), PARAGLAS and COMOGLAS (which are manufactured by KURARAY CO., LTD.), DEGLAS and DELAPRISM (which are manufactured by Asahikasei Technoplus Corporation), Kanase Lite (which is manufactured by Kanase Industries Co., Ltd.), and the like.

Examples of the polycarbonate resin base material include CARBOGLASS (manufactured by Asahi Glass Co., Ltd.), Iris Polycarbonate Sheet (manufactured by Irisshinyo Co., Ltd.), Iupilon (manufactured by Mitsubishi Gas Chemical Company, Inc.), Panlite (manufactured by Teijin Ltd.), Polycarbonate Plate (manufactured by Takiron Co., Ltd.), Sunloid PC (porikaeisu) (manufactured by Sumitomo Bakelite Co., Ltd.), Polycarbonate Plate (manufactured by Sekisui Seikei Co., Ltd.), PC Mirror (manufactured by Ryoko Co., Ltd.), and the like.

Examples of the PET resin base material include Sunloid PETG (PETeisu) (manufactured by Mitsubishi Bakelite), ESTELLA and ESTELLA SUPER (manufactured by Sekisui Seikei Co., Ltd.), PETTELLUS (manufactured by Mitsubishi Plastics Inc.), PETEC (manufactured by Takiron Co., Ltd.), Mineron (manufactured by Mineron Kasei Co., Ltd.), Polytec A-PET Sheet (manufactured by Poritekku Kabushikikaisha), A-PET Resin Sheet (manufactured by Teijin Ltd.), Lumirror (manufactured by Toray Industries, Inc.), Cosmo Shine (manufactured by Toyobo Co., Ltd.), and the like.

The film thickness of a coating film in accordance with one or more embodiments of the present invention is preferably 1 μm to 100 μm. In a case where the thickness of the coating film is less than 1 μm, the coating film tends to be influenced by hardness of the plastic base material, the film base material, the sheet base material, or the like base material itself, so that a resultant hardness tends to be insufficient. On the other hand, in a case where the thickness of the coating film is larger than 100 μm, curing tends to be slower since an active energy ray does not reach a deep part. In one or more embodiments, however, in a case where the thickness of the coating film is arranged to be 100 μm or more, it is preferable to employ a method according to which coating and irradiation with an active energy ray are repeated several times so as to carry out complete coating and irradiation.

One or more embodiments of the present invention are not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

One or more embodiments of the present invention can be also configured as follows.

[1] A curable composition including:
a condensation product (A) having a weight average molecular weight of 30,000 or less; and
a curing agent (B) which cures an epoxy group,
the condensation product (A) being obtained by hydrolysis and condensation of a silane compound (I) and a silane compound (II) in the presence of a neutral salt catalyst, a molar ratio of the silane compound (II) to the silane compound (I) being 9 or less,
the condensation product (A) having a ratio Y/X of 0.2 or less, where X is the number of moles of an $OR^3$ group directly bonded to silicon atoms of the silane compounds (I) and (II) which are materials of the condensation product (A) and Y is the number of moles of an $OR^3$ group directly bonded to a silicon atom of the condensation product (A), the silane compound (I) having a hydrolyzable silyl group and being represented by the following General Formula (I):

$$R^1\text{—}(SiR^2{}_a(OR^3)_{3-a}) \qquad (I),$$

wherein $R^1$ is an alkyl group having 1 to 10 carbon atoms and having a terminal substituted with an epoxy structure-containing group, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2, and the silane compound (II) having a hydrolyzable silyl group and being represented by the following General Formula (II):

$$R^4\text{—}(SiR^2{}_a(OR^3)_{3-a}) \qquad (II),$$

wherein $R^4$ is a group having no epoxy structure-containing group and selected from among a substituted or unsubstituted alkyl group, an alkenyl group, and a substituted aryl group, each of which has 1 to 10 carbon atoms, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.

[2] The curable composition as set forth in [1], wherein:
the neutral salt catalyst is a salt made of a combination of the following (a) as a cation and the following (b) as an anion:
(a) any one selected from the group consisting of Group 1 element ions, Group 2 element ions, a tetraalkylammonium ion, and a guanidium ion; and
(b) any one selected from the group consisting of a sulfate ion, a nitrate ion, a perchlorate ion, and Group 17 element ions except for a fluoride ion.

[3] The curable composition as set forth in [1] or [2], wherein:
the neutral salt (A) is a salt made of a combination of the following (a) as a cation and the following (b) as an anion:
(a) any one selected from the group consisting of Group 1 element ions and Group 2 element ions; and
(b) any one selected from the group consisting of a chloride ion, a bromide ion, and an iodide ion.

[4] The curable composition as set forth in any one of [1] to [3], wherein the curing agent (B) is an acid-forming agent which carries out cationic polymerization of the epoxy group.

[5] The curable composition as set forth in any one of [1] to [4], wherein the curing agent (B) is a compound containing a fluorophosphate group, a fluoroantimonate group or a fluoroborate group.

[6] The curable composition as set forth in any one of [1] to [5], further including a metal-oxide-fine-particle (C) having an average particle diameter of 100 nm or less.

[7] The curable composition as set forth in [6], wherein the metal-oxide-fine-particle (C) is a silica fine particle.

[8] The curable composition as set forth in any one of [1] to [7], wherein:
in a case where the curing agent (B) is a curing agent which polymerizes the epoxy group, an amount of the curing agent (B) is 0.5 parts by weight to 10 parts by weight with respect to 100 parts by weight of the condensation product (A);

in a case where the curing agent (B) is a curing agent which cures the epoxy group when added to the epoxy group, an amount of the curing agent (B) is 10 parts by weight to 150 parts by weight with respect to 100 parts by weight of the condensation product (A); and an amount of the metal-oxide-fine-particle (C) is 0 parts by weight to 150 parts by weight with respect to 100 parts by weight of the condensation product (A).

[9] The curable composition as set forth in any one of [1] to [8], wherein the curing agent (B) is a compound containing at least one selected from the group consisting of a triphenylsulfonium group, a diphenylsulfonium group, and a diphenyliodonium group.

[10] The curable composition as set forth in any one of [1] to [9], wherein the curing agent (B) cures the epoxy group by irradiation with an active energy ray.

[11] A cured product obtained by curing the curable composition as set forth in any one of [1] to [10].

[12] A method for producing a laminate, including the steps of: applying, to a base material, the curable composition as set forth in any one of [1] to [10]; and forming a cured coating by curing the curable composition.

[13] A laminate obtained by the method as set forth in [12].

EXAMPLES

The following describes one or more embodiments of the present invention, according to Examples. The embodiments of the present invention however are not limited to the following description.

The following substances are used in Examples and Comparative Examples.

Silane Compound (I) Having Hydrolyzable Silyl Group
A-186: a product of Momentive Performance Materials Japan LLC, 2-(3,4-epoxycyclohexyl)ethyl trimethoxysilane, Molecular weight: 246.3
A-187: a product of Momentive Performance Materials Japan LLC, 3-glycidoxypropyl trimethoxysilane, Molecular weight: 236.3
Silane Compound (II) Having Hydrolyzable Silyl Group
PS A-174: a product of Momentive Performance Materials Japan LLC, 3-methacryloxypropyl trimethoxysilane, Molecular weight: 248.4
A-171: a product of Momentive Performance Materials Japan LLC, vinyl trimethoxysilane, Molecular weight: 148.2
A-1630: a product of Momentive Performance Materials Japan LLC, methyl trimethoxysilane, Molecular weight: 136.2
A-189: a product of Momentive Performance Materials Japan LLC, 3-mercaptopropyl trimethoxysilane, Molecular weight: 196.3
KBM-5103: a product of Shin-Etsu Chemical Co., Ltd., 3-acryloyloxypropyl trimethoxysilane, Molecular weight: 234.3
Neutral Salt
Magnesium chloride (manufactured by Wako Pure Chemical Industries, Ltd., Special Grade, Molecular weight: 95.2)
Sodium chloride (manufactured by Wako Pure Chemical Industries, Ltd., Special Grade, Molecular weight: 58.4)
Epoxy Curing Agent (B) (Curing Agent (B) which Cures an Epoxy Group)
Pyromellitic anhydride: a product of Tokyo Chemical Industry Co., Ltd., Molecular weight: 218.2
CPI-101A: a product of San-Apro Ltd., triaryl sulfonium.SbF6 salt Hexamethylenediamine: a product of Tokyo Chemical Industry Co., Ltd., Molecular weight: 116.2
Benzyldimethylamine: a product of Tokyo Chemical Industry Co., Ltd., Molecular weight: 135.1
Diluting Solvent
PGME: 1-methoxy-2-propanol (a product of Daicel Corporation, Molecular weight: 90)
Methanol: a product of Mitsubishi Gas Chemical Company, Inc., Molecular weight: 32
Others
HCl: hydrochloric acid (manufactured by Wako Pure Chemical Industries, Ltd., 0.01 mole/L)
Formic acid: a product of Wako Pure Chemical Industries, Ltd., 0.01 mole/L
TEA: trimethylamine (manufactured by Wako Pure Chemical Industries, Ltd., Molecular weight: 101.2)
2-hydroxy-2-methylpropiophenone: a product of Tokyo Chemical Industry Co., Ltd., Molecular weight: 164.2
DPHA: dipentaerythritol hexaacrylate (manufactured by Shin-Nakamura Chemical Co., Ltd., Molecular weight: 578)
V-8804: dispersion of organo silica sol in PGME (manufactured by JGC Catalysts and Chemicals Ltd., non-volatile component: 40%)

Respective condensation products obtained in Synthesis Examples are evaluated as follows.

(Determination of Quantity of OR Group Directly Bonded to Silicon)

With use of deuterated acetone as a solvent, $^1$H-NMR and $^{29}$Si-NMR measurements were carried out, so that an OR group which was directly bonded to silicon in a silane compound before and after reaction was measured and a Y/X ratio was calculated. For the measurements, JNM-LA400 manufactured by JEOL Ltd. was used.

(Measurement of Weight Average Molecular Weight)

A weight average molecular weight was measured by GPC. In other words, the weight average molecular weight was calculated in terms of polystyrene, by using, as a liquid feeding system, HLC-8220GPC manufactured by Tosoh Corporation, using, as a column, TSK-GEL Type H manufactured by Tosoh Corporation, and using THF as a solvent.

(Evaluation of Residual of Epoxy Group)

JNM-LA400 manufactured by JEOL Ltd. was used for a resultant condensation product, so that $^1$H-NMR measurement was carried out with use of deuterated acetone as a solvent. Table 1 shows a result of this measurement as "residual epoxy ratio".

Physical properties of specimens obtained in Examples and Comparative Examples were evaluated as below. Note that in this evaluation of the specimens, measurement was carried out after the specimen had been left to stand still for seven days after curing.

(Adhesiveness)

A cut was made by use of a cutter on a cured coating film. The cut here included a crosscut so as to have a pattern having 100 squares in a 10×10 matrix form and at 1 mm intervals between adjacent squares. On the cut, CELLO-TAPE (registered trademark) manufactured by Nichiban Co., Ltd. was attached and then peeled off with force upward at 90° with respect to the cured coating film. Then, the presence of peeling of the cured coating film from the base material was visually checked. Then, a case where the cured coating film completely adhered to the base material was evaluated as 100 points, whereas a case where the cured coating film was completely peeled off was evaluated as 0 point. That is, evaluation was made by points such that one square corresponds to one point.

(Abrasion Resistance)

An abrasion test (load: 500 gf, rotation: 500 times) of a cured coating was carried out by use of a Taber type abrasion tester (using weardisc CS-10F) manufactured by MYS-TESTER. A turbidity of the cured coating before and after the abrasion test was measured by using a hazemeter. Then, the value of [turbidity after the abrasion test−turbidity before the abrasion test] was defined as ΔHaze (in a case where ΔHaze is 15 or less, abrasion resistance is good).

(Hardness)

According to JIS K5600, pencil hardness was evaluated. A pencil hardness test is a test in which (i) pencils having different hardness from 6B to 9H are used and each of the pencils is moved with a load of 750 g so as to draw a line on a coating film, and (ii) a rank (e.g., 3H) of a pencil being used at the time when a scratch is made is recorded.

(Alkali Resistance)

A cured coating film was spotted with 0.5 mL of 0.05 N sodium hydroxide solution, and a cap was placed so as to prevent moisture volatilization. After heating at 55° C. for 4 hours, the sodium hydroxide solution was wiped off. Then, the presence of a spot trace was evaluated by YES (present)/NO (absent).

(Resistance to Heat Crack)

After heating at 110° C. for 24 hours by use of a hot-air dryer, the presence of a crack in a coating film was visually observed and evaluated by YES (present)/NO (absent).

(Warpage)

A resultant laminate was placed on a horizontal pedestal such that a coating film surface would be an upper surface. Then, a distance in a vertical direction was measured from an upper surface of the pedestal to each of four vertices of the upper surface of the laminate. Then, an average value of the distances thus obtained was calculated. In a case where the laminate warped such that a coated-surface side had an upward curve (a corner of a lower surface of the laminate floats above the surface of the pedestal), the distance was set to a positive value. On the other hand, in a case opposite to the above case, the distance was set to a negative value. Note that as a result of evaluation of warpage of a PC sheet alone as the base material, the distance was 0 mm.

Synthesis Examples 1 to 18 of Condensation Product (A)

Mixed substances (unit of respective amounts of the mixed substances: parts by weight) shown in Table 1 were introduced in a reactor equipped with a stirring device, a thermometer, and a reflux condenser. Then, the mixed substances were stirred at a reaction temperature for a reaction time as shown in Table 1, so that a condensation product was obtained. The condensation product thus obtained was devolatilized and condensed under reduced pressure by use of an evaporator, and adjusted to be a 50% solution with use of PGME. Table 1 shows an evaluation result of a resultant condensation product.

In Table 1, compounds written in items from "Silane Compound (I)" to "Solvent" are the mixed substances. Further, the weight average molecular weight, the residual epoxy ratio, and the Y/X ratio are each a value of a resultant condensation product (A) obtained as above.

TABLE 1

| | Compound Name | Functional Group | Molecular Weight | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 | Synthesis Example 10 | Synthesis Example 11 | Synthesis Example 12 | Synthesis Example 13 | Synthesis Example 14 | Synthesis Example 15 | Synthesis Example 16 | Synthesis Example 17 | Synthesis Example 18 |
|---|---|---|---|---|---|---|---|---|---|---|---|---|---|---|---|---|---|---|---|---|---|
| Silane Compound (I) | A187 | glycidyl ether | 236.3 | 100 | 100 | 100 | 100 | 100 | 100 | 100 | | 95.9 | | | 100 | 100 | 100 | 100 | | | |
| | A186 | alicyclic epoxy | 246.4 | | | | | | | | 100 | | 100 | 100 | | | | | 100 | | |
| Silane Compound (II) | A1630 | methyl | 136.2 | | 14.4 | 231 | 519 | | | | | | | | | | | | | | |
| | A171 | vinyl | 148.2 | | | | | 15.7 | | | | | | | | | | | | | |
| | A174 | methacryloyl | 234.3 | | | | | | 26.3 | | | | | | | | | | 23.7 | 109.5 | |
| | KBM5103 | acryloyl | 248.4 | | | | | | | 24.8 | | | | | | | | | | | |
| | A189 | thiol | 196.3 | | | | | | | | | | 8.9 | | | | | | | | 188.4 |
| Neutral Salt | MgCl2 | | 95.2 | 0.05 | 0.06 | 0.17 | 0.31 | 0.06 | 0.06 | 0.06 | 0.05 | 0.10 | 0.05 | | | | | | | 0.06 | 0.10 |
| | NaCl | | 58.4 | | | | | | | | | | | 0.05 | | | | | | | |
| Acid Catalyst | HCl (0.01N) aq. | | | | | | | | | | | | | | 13.7 | 13.7 | | | | | |
| | Formic acid (0.01N) aq. | | | | | | | | | | | | | | | | | | | 13.1 | | |
| Ease Catalyst | TEA | tertiary amine | 101.2 | | | | | | | | | | | | | | 0.008 | | | | |
| Water | Distilled water | | 18.0 | 11.4 | 14.3 | 57.1 | 114.3 | 14.3 | 14.3 | 14.3 | 11.0 | 21.9 | 12.2 | 11.0 | 13.7 | 13.7 | 11.4 | 11.4 | 13.1 | 22.9 | 22.9 |
| Solvent | Methanol | | | 11.4 | 14.3 | 269.6 | 440.5 | 14.3 | 14.3 | 14.3 | 11.0 | 21.9 | 12.2 | 11.0 | 13.7 | 13.7 | 11.4 | 11.4 | 13.1 | 22.9 | 22.9 |
| Reaction Temperature | | | | 105 | 105 | 105 | 105 | 105 | 105 | 105 | 105 | 105 | 105 | 105 | 105 | 105 | 105 | 105 | 105 | 105 | 105 |
| Reaction Time | | | | 8 | 8 | 12 | 12 | 8 | 8 | 8 | 8 | 8 | 8 | 4 | 10 | 10 | 5 | 10 | 5 | 8 | 8 |
| Weight Average Molecular Weight | | | | 3200 | 3000 | 17000 | 26000 | 3000 | 2800 | 2900 | 3200 | 4200 | 3900 | 5300 | 1600 | 1800 | gelatinized | 2300 | gelatinized | 3800 | 6600 |
| Residual Epoxy | | | | >0.9 | >0.9 | >0.9 | >0.9 | >0.9 | >0.9 | >0.9 | >0.9 | >0.9 | >0.9 | >0.9 | <0.2 | <0.2 | gelatinized | <0.2 | gelatinized | >0.9 | >0.9 |
| Ratio Y/X Ratio | | | | ≤0.2 | ≤0.2 | ≤0.2 | ≤0.2 | ≤0.2 | ≤0.2 | ≤0.2 | ≤0.2 | ≤0.2 | ≤0.2 | ≤0.2 | >0.5 | >0.5 | gelatinized | >0.5 | gelatinized | ≤0.2 | ≤0.2 |

Example 1

[Preparation of Coating Solution]

A coating solution was prepared by using, as a condensation product, Synthesis Example 1 [condensation product (50% solution) of A-187 (3-glycidyloxypropyl trimethoxysilane)], and mixing 32.6 parts by weight of pyromellitic anhydride as a curing agent with respect to 100 parts by weight of the condensation product. Note that the coating solution was diluted for use in Example 1, with use of 73.9 parts by weight of PGME (1-methoxy-2-propanol) as a diluting solvent, so that the percentage of a non-volatile component will be 40%.

[Preparation of Laminate]

A resultant coating solution obtained as above was applied, to polycarbonate (EC-100, thickness: 1.0 mm) manufactured by Sumitomo Bakelite, by use of a bar coater #20 so that the thickness of a dried film will be approximately 12 μm. Then, removal of a diluting solvent and curing reaction (hereinafter, referred to as "thermal curing") were carried out concurrently at 120° C. for an hour by using a hot-air dryer, and completed at the same time. As a result, a specimen was obtained. Table 2 shows a physical property evaluation result of the specimen thus obtained.

Example 2

[Preparation of Coating Solution]

A coating solution was obtained as in Example 1 except that the type and the amount of the curing agent was changed to 2.5 parts by weight of CPI-101A (triarylsulfonium hexafluoroantimonate salt) and that the amount of PGME was changed to 28.8 parts by weight.

[Preparation of Laminate]

The coating solution thus obtained was applied, to polycarbonate (EC-100, thickness: 1.0 mm) manufactured by Sumitomo Bakelite, by use of a bar coater #20 so that the thickness of a dried film will be approximately 12 μm. Then, the coating solution was heated at 120° C. for 2 minutes by using a hot-air dryer so that a diluting solvent will be removed. Thereafter, the coating solution was cured by ultraviolet irradiation (hereinafter, referred to as "ultraviolet curing") with use of a high-pressure mercury lamp in the air. The ultraviolet irradiation was arranged such that an accumulated amount of light having a wavelength of 310 nm to 390 nm was 1000 mJ/cm$^2$ at 240 mW. As a result, a specimen was obtained. Table 2 shows a physical property evaluation result of the specimen thus obtained.

Example 3

A specimen was obtained by thermal curing as in Example 1 except that the type and the amount of the curing agent was changed to 6.9 parts by weight of hexamethylenediamine and that the amount of PGME was changed to 35.4 parts by weight in obtaining the coating solution in [Preparation of Coating Solution]. Table 2 shows a physical property evaluation result of the specimen thus obtained.

Example 4

A specimen was obtained by thermal curing as in Example 1 except that the type and the amount of the curing agent was changed to 32.3 parts by weight of benzyldimethylamine and that the amount of PGME was changed to 73.5 parts by weight in obtaining the coating solution in [Preparation of Coating Solution]. Table 2 shows a physical property evaluation result of the specimen thus obtained.

Example 5

A specimen was obtained by ultraviolet curing as in Example 2 except that the condensation product was changed to Synthesis Example 2 [A-187 (80 mole %)/A-1630 methyl trimethoxysilane (20 mole %)] in obtaining the coating solution in [Preparation of Coating Solution]. Table 2 shows a physical property evaluation result of the specimen thus obtained.

Example 6

A specimen was obtained by ultraviolet curing as in Example 2 except that the condensation product was changed to Synthesis Example 3 [A-187 (20 mole %)/A-1630 (80 mole %)] in obtaining the coating solution in [Preparation of Coating Solution]. Table 2 shows a physical property evaluation result of the specimen thus obtained.

Example 7

A specimen was obtained by ultraviolet curing as in Example 2 except that the condensation product was changed to Synthesis Example 4 [A-187 (10 mole %)/A-1630 (90 mole %)] in obtaining the coating solution in [Preparation of Coating Solution]. Table 2 shows a physical property evaluation result of the specimen thus obtained.

Example 8

A specimen was obtained by ultraviolet curing as in Example 2 except that the condensation product was changed to Synthesis Example 5 [A-187 (80 mole %)/A-171 (vinyl trimethoxysilane (20 mole %)] in obtaining the coating solution in [Preparation of Coating Solution]. Table 2 shows a physical property evaluation result of the specimen thus obtained.

Example 9

A specimen was obtained by ultraviolet curing as in Example 2 except that (i) the condensation product was changed to Synthesis Example 6 [A-187 (80 mole %)/A-174 (3-methacryloyloxy trimethoxysilane (20 mole %))], (ii) the amount of PGME was changed to 30.3 parts by weight, and (iii) the type and the amount of the curing agent was changed to 2.5 parts by weight of CPI-101A (triarylsulfonium hexafluoroantimonate salt) and 1.0 parts by weight of 2-hydroxy-2-propiophenone in obtaining the coating solution in [Preparation of Coating Solution]. Table 2 shows a physical property evaluation result of the specimen thus obtained.

Example 10

A specimen was obtained by ultraviolet curing as in Example 9 except that the condensation product was changed Synthesis Example 7 [A-187 (80 mole %)/KBM5103 (20 mole %)] in obtaining the coating solution in [Preparation of Coating Solution]. Table 2 shows a physical property evaluation result of the specimen thus obtained.

Example 11

A specimen was obtained by ultraviolet curing as in Example 2 except that the condensation product was changed to Synthesis Example 8 [A-186 (2-(3,4-epoxycyclohexyl)ethyl trimethoxysilane)] in obtaining the coating solution in [Preparation of Coating Solution]. Table 2 shows a physical property evaluation result of the specimen thus obtained.

Example 12

A specimen was obtained by ultraviolet curing as in Example 2 except that the condensation product was changed to Synthesis Example 9 [A-187 (50 mole %)/A-186 (50 mole %)] in obtaining the coating solution in [Preparation of Coating Solution]. Table 2 shows a physical property evaluation result of the specimen thus obtained.

Example 13

A specimen was obtained by ultraviolet curing as in Example 2 except that the condensation product was changed to Synthesis Example 10 [A-186 (80 mole %)/A-189 (3-mercaptopropyl trimethoxysilane (20 mole %)] in obtaining the coating solution in [Preparation of Coating Solution]. Table 2 shows a physical property evaluation result of the specimen thus obtained.

Example 14

A specimen was obtained by ultraviolet curing as in Example 2 except that the condensation product was changed to Synthesis Example 11 [synthesis catalyst being changed to sodium chloride from magnesium chloride] in obtaining the coating solution in [Preparation of Coating Solution]. Table 2 shows a physical property evaluation result of the specimen thus obtained.

Example 15

A specimen was obtained by ultraviolet curing as in Example 2 except that 30 parts by weight of V-8804 (silica sol manufactured by JGC Catalysts and Chemicals Ltd.) was mixed to 70 parts by weight of the condensation product of Synthesis Example 1 in obtaining the coating solution in [Preparation of Coating Solution].
Table 2 shows a physical property evaluation result of the specimen thus obtained.

TABLE 2

| | Mixed Substance | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 |
|---|---|---|---|---|---|---|---|---|---|---|---|---|---|---|---|---|
| Condensation Product (A) | Synthesis Example 1 (50% diluted) | 100 | 100 | 100 | 100 | | | | | | | | | | | 100 |
| | Synthesis Example 2 (50% diluted) | | | | | 100 | | | | | | | | | | |
| | Synthesis Example 3 (50% diluted) | | | | | | 100 | | | | | | | | | |
| | Synthesis Example 4 (50% diluted) | | | | | | | 100 | | | | | | | | |
| | Synthesis Example 5 (50% diluted) | | | | | | | | 100 | | | | | | | |
| | Synthesis Example 6 (50% diluted) | | | | | | | | | 100 | | | | | | |
| | Synthesis Example 7 (50% diluted) | | | | | | | | | | 100 | | | | | |
| | Synthesis Example 8 (50% diluted) | | | | | | | | | | | 100 | | | | |
| | Synthesis Example 9 (50% diluted) | | | | | | | | | | | | 100 | | | |
| | Synthesis Example 10 (50% diluted) | | | | | | | | | | | | | 100 | | |
| | Synthesis Example 11 (50% diluted) | | | | | | | | | | | | | | 100 | |
| Curing Agent (B) | pyromellitic anhydride | 32.5 | | | | | | | | | | | | | | |
| | CPI-101A | | 2.5 | | | 2.5 | 2.5 | 2.5 | 2.5 | 2.5 | 2.5 | 2.5 | 2.5 | 2.5 | 2.5 | 2.5 |
| | hexamethylenediamine | | | 5.9 | | | | | | | | | | | | |
| | benzyldimethylamine | | | | 32.3 | | | | | | | | | | | |
| | 2-hydroxy-2 methylpropiophenone | | | | | | | | | 1.0 | 1.0 | | | | | |

TABLE 2-continued

| | Mixed Substance | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 |
|---|---|---|---|---|---|---|---|---|---|---|---|---|---|---|---|---|
| Multi-functional Acrylate | DPHA | | | | | | | | | | | | | | | |
| Silica Particles | V-8804 | | | | | | | | | | | | | | | 21.43 |
| Diluting Solvent | PGME | 73.9 | 28.9 | 35.4 | 73.5 | 28.8 | 28.8 | 28.8 | 28.8 | 30.3 | 30.3 | 28.8 | 28.8 | 28.8 | 28.8 | 50.2 |
| Curing Condition | | Thermal | UV | Thermal | Thermal | UV | UV | UV | UV | UV | UV | UV | UV | UV | UV | UV |
| Evaluation Items | Adhesiveness | 100 | 100 | 100 | 100 | 100 | 100 | 100 | 100 | 100 | 100 | 100 | 100 | 100 | 100 | 100 |
| | Resistance to Taber Abrasion (ΔH) | 8 | 4 | 7 | 7 | 4 | 10 | 14 | 4 | 4 | 4 | 3 | 3 | 4 | 3 | 3 |
| | Hardness | HB | HB | HB | HB | HB | F | F | HB | HB | HB | H | H | HB | H | H |
| | Alkali Resistance (Yes: Present No: Absent) | Yes | Yes | Yes | Yes | Yes | Yes | Yes | Yes | Yes | Yes | Yes | Yes | Yes | Yes | Yes |
| | Resistance to Heat Crack (Yes: Present No: Absent) | Yes | Yes | Yes | Yes | Yes | Yes | Yes | Yes | Yes | Yes | Yes | Yes | Yes | Yes | Yes |
| | Warpage | 0 | −0.1 | 0 | 0 | −0.1 | 0 | 0.4 | 0.1 | 0.1 | 0.1 | −0.3 | −0.1 | −0.1 | −0.3 | −0.2 |

Comparative Example 1

A specimen was obtained by thermal curing as in Example 1 except that (i) the condensation product was changed to 100 parts by weight of Synthesis Example 12 [condensation product of A-187 which product was obtained by using HCl as a condensation catalyst], (ii) the amount of the curing agent was changed to 27.0 parts by weight, and (iii) the amount of PGME was changed to 65.5 parts by weight in obtaining the coating solution in [Preparation of Coating Solution]. Table 3 shows a physical property evaluation result of the specimen thus obtained.

Comparative Example 2

A specimen was obtained by ultraviolet curing as in Example 2 except that the condensation product was changed to Synthesis Example 12 in obtaining the coating solution in [Preparation of Coating Solution]. Table 3 shows a physical property evaluation result of the specimen thus obtained.

Comparative Example 3

A specimen was obtained by thermal curing as in Example 3 except that the condensation product was changed to Synthesis Example 12 in obtaining the coating solution in [Preparation of Coating Solution]. Table 3 shows a physical property evaluation result of the specimen thus obtained.

Comparative Example 4

A specimen was obtained by thermal curing as in Example 4 except that the condensation product was changed to Synthesis Example 12 and that the amount of benzyldimethylamine as the curing agent was changed to 26.8 parts by weight in obtaining the coating solution in [Preparation of Coating Solution]. Table 3 shows a physical property evaluation result of the specimen thus obtained.

Comparative Example 5

A specimen was obtained by ultraviolet curing as in Example 2 except that the condensation product was changed to Synthesis Example 13 [condensation catalyst being formic acid] in obtaining the coating solution in [Preparation of Coating Solution]. Table 3 shows a physical property evaluation result of the specimen thus obtained.

Comparative Example 6

A specimen was obtained by ultraviolet curing as in Example 2 except that the condensation product was changed to Synthesis Example 15 [no condensation catalyst] in obtaining the coating solution in [Preparation of Coating Solution]. Table 3 shows a physical property evaluation result of the specimen thus obtained.

Comparative Example 7

A specimen was obtained by ultraviolet curing as in Example 2 except that the condensation product was changed to Synthesis Example 17 [A187 (5 mole %)/A-1630 (95 mole %)] in obtaining the coating solution in [Preparation of Coating Solution]. Table 3 shows a physical property evaluation result of the specimen thus obtained.

Comparative Example 8

A specimen was obtained by ultraviolet curing as in Example 2 except that the condensation product was changed to Synthesis Example 18 [A187 (5 mole %)/KBM-5103 (95 mole %)] in obtaining the coating solution in [Preparation of Coating Solution]. Table 3 shows a physical property evaluation result of the specimen thus obtained.

Comparative Example 9

A specimen was obtained by ultraviolet curing as in Example 2 except that (i) 100 parts by weight of DPHA (dipentaerythritol hexaacrylate) was used as a multifunctional acrylate, (ii) 3.0 parts by weight of 2-hydroxy-2-propiophenone was used as the curing agent, and (iii) 154.5 parts by weight of PGME was mixed as a diluent, in obtaining the coating solution in [Preparation of Coating Solution]. Table 3 shows a physical property evaluation result of the specimen thus obtained.

TABLE 3

| | Mixed Substance | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Condensation Product (A) | Synthesis Example 12 (50% diluted) | 100 | 100 | 100 | 100 | | | | | |
| | Synthesis Example 13 (50% diluted) | | | | | 100 | | | | |
| | Synthesis Example 14 (50% diluted) | | | | | | 100 | | | |
| | Synthesis Example 15 (50% diluted) | | | | | | | | | |
| | Synthesis Example 16 (50% diluted) | | | | | | | | | |
| | Synthesis Example 17 (50% diluted) | | | | | | | 100 | | |
| | Synthesis Example 18 (50% diluted) | | | | | | | | 100 | |
| Curing Agent (B) | pyromellitic anhydride | 27.0 | | | | | | | | |
| | CPI-101A | | 2.5 | | | 2.5 | 2.5 | 2.5 | 2.5 | |
| | hexamethylenediamine | | | 5.8 | | | | | | |
| | benzyldimethylamine | | | | 26.8 | | | | | |
| | 2-hydroxy-2 methylpropiophenone | | | | | | | | 1.0 | 3.0 |
| Multifunctional Acrylate | DPHA | | | | | | | | | 100 |
| Silica Particles | V-8804 | | | | | | | | | |
| Diluting Solvent | PGME | 65.5 | 28.8 | 33.6 | 65.2 | 28.8 | 28.8 | 28.8 | 30.3 | 254.5 |
| Curing Condition | Thermal | Thermal | UV | Thermal | Thermal | UV | UV | UV | UV | UV |
| Evaluation Items | Adhesiveness | 100 | 100 | 100 | 100 | 100 | 100 | 100 | 20 | 100 |
| | Resistance to Taber Abrasion (ΔH) | 23 | 16 | 21 | 25 | 16 | 18 | 25 | 8 | 8 |
| | Hardness | B | B | B | B | B | B | 2B | F | HB |
| | Alkali Resistance (Yes: Present No: Absent) | No | No | No | No | No | No | No | No | No |
| | Resistance to Heat Crack (Yes: Present No: Absent) | No | No | No | No | No | No | No | No | No |
| | Warpage | 0 | 0 | 0 | 0 | 0 | 0 | 0 | 2.3 | 3.8 |

In Examples 1 to 4, the condensation product (A) obtained in Synthesis Example 1 was mixed with different curing agents, respectively, and then the condensation product (A) in each of Examples 1 to 4 was cured. The condensation product (A) used in Examples 1 to 4 was a condensation product (Synthesis Example 1) obtained by synthesis of A-187 with a neutral salt (in the presence of a neutral salt catalyst). A resultant cured product in each of Examples 1 to 4 was a coating film excellent in abrasion resistance and chemical resistance regardless of kind of the curing agent. Further, a laminate having less warpage could be obtained.

Among the above cured products of Examples 1 to 4, the cured product (Example 2) cured with use of a cationic polymerization initiator had the highest abrasion resistance. On the other hand, though the condensation product (A) was cured by using various kinds of curing agents in Comparative Examples 1 to 4, respectively, the physical properties of the cured product in each of Comparative Examples 1 to 4 were inferior to those of the cured products each obtained by using the condensation product synthesized with use of a neutral salt. This is because the catalyst used for synthesis of the condensation product was hydrochloric acid and accordingly, the epoxy group was hydrolyzed. The same applied to Comparative Example 5 (formic acid catalyst) and Comparative Example 6 (no catalyst).

In each of Examples 5 to 10, another silane compound was subjected to co-condensation with A-187. In each of Examples 5 to 10, a cured product having sufficiently high abrasion resistance and chemical resistance could be obtained. Further, a laminate having less warpage could be obtained.

However, in each of Examples 6 and 7, the cured product had abrasion resistance and hardness which were slightly lower in respective values as compared to those of other Examples. This is considered to result from low co-condensation ratios of A-187 in Examples 6 and 7 (20 mole % (Example 6) and 10 mole % (Example 7)).

On the other hand, the cured product obtained in each of Examples 6 and 7 had adhesiveness, alkali resistance, resistance to heat crack, and warpage which were equivalent to those of other Examples. Further, the cured product obtained in each of Examples 6 and 7 also had good abrasion resistance since ΔHaze was 15 or less. In addition, the cured product obtained in each of Examples 6 and 7 also had hardness whose value was sufficient for practical usage. Therefore, the cured product obtained in each of Examples 6 and 7 can be also said to sufficiently yield the effect according to one or more embodiments of the present application.

In each of Examples 11 to 14, the silane compound having the epoxy structure-containing group was changed from A-187 to A-186 (having an epoxycyclohexyl group). However, a cured product obtained in each of Examples 11 to 14 has performance equivalent to or higher than the cured product obtained by using the condensation product of A-187.

In particular, in Example 13, A-189 (a silane compound having a thiol group) was subjected to co-condensation (Synthesis Example 10), and though an epoxy group and a thiol group co-existed in the condensation product, a condensation product could be obtained without gelatinization (Table 1). As a result, by curing the condensation product, a cured product having high abrasion resistance and high chemical resistance could be obtained. Further, a laminate having less warpage could be obtained. This is considered to result from high resistance of the epoxycyclohexyl group against nucleophilic attack.

In Example 14, the neutral salt catalyst was changed from magnesium chloride to sodium chloride. Accordingly, the result of Example 14 suggests that changing the neutral salt does not affect the condensation product and the cured product. On the other hand, in each of Synthesis Example 14 (in which a trimethylamine catalyst was used) and Synthesis Example 16 (in which a formic acid catalyst was used), gelatinization had occurred. Consequently, a condensation product could not be obtained (Table 1). This result suggests that the catalyst in condensation is highly important and that the neutral salt has high catalyst performance.

In Example 15, organo silica sol was mixed as metal-oxide-fine-particles to the condensation product. As compared to Example 2 in which organo silica sol was not mixed, both of abrasion resistance and hardness were slightly improved. Further, a laminate having less warpage could be obtained. This is considered to result from an increased crosslink density of the coating film as a whole due to mixing silica particles.

In each of Comparative Examples 7 and 8, the ratio of the silane compound (silane compound (I)) having an epoxy group in the condensation product was low. Accordingly, in each of Comparative Examples 7 and 8, adhesiveness of a cured product with a base material, alkali resistance, and resistance to heat crack were poorer. This resulted in lower abrasion resistance of the cured product in Comparative Example 7.

Further, in Comparative Example 8, the ratio of the silane compound having an epoxy group was low, and the silane compound having an acryloyl group was high, instead. Accordingly, a resultant laminate has large warpage due to cure shrinkage caused by crosslinking of the acryloyl group.

In Comparative Example 9, a cured product was obtained by using only multifunctional acrylate in place of the condensation product including a silane compound. In Comparative Example 9, a resultant cured product had high abrasion resistance, but insufficient alkali resistance. Further, cure shrinkage caused by curing of acrylate was large. This resulted in formation of a crack in heat curing.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A curable composition comprising:
    a neutral salt-catalyzed condensation product having a weight average molecular weight of 2,000 or more and 30,000 or less and comprising a plurality of first units derived from a first silane compound and, optionally, a plurality of second units derived from a second silane compound; and
    a curing agent which cures an epoxy group,
    wherein the condensation product has a molar ratio of the second silane-derived units to the first silane-derived units of from 0 to 9,
    the condensation product having a ratio Y/X of 0.2 or less, wherein X is the number of moles of an $OR^3$ group directly bonded to silicon atoms of the first silane compound and the second silane compound, and Y is the number of moles of an $OR^3$ group directly bonded to a silicon atom of the condensation product,
    the first silane compound having a hydrolyzable silyl group and being represented by: $R^1$—$(SiR^2_a(OR^3)_{3-a})$,
    wherein $R^1$ is an alkyl group having 1 to 10 carbon atoms and having a terminal substituted with an epoxy structure-containing group, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2, and
    the second silane compound having a hydrolyzable silyl group and being represented by: $R^4$—$(SiR^2_a(OR^3)_{3-a})$, and
    wherein $R^4$ does not have an epoxy structure-containing group and $R^4$ is a group selected from among a substituted or unsubstituted alkyl group, an alkenyl group, and a substituted aryl group, each of which has 1 to 10 carbon atoms, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.

2. The curable composition according to claim 1, wherein the neutral salt catalyst is a salt made by combining a cation and an anion, wherein
    the cation is one selected from the group consisting of Group 1 element ions, Group 2 element ions, a tetraalkylammonium ion, and a guanidium ion; and
    the anion is one selected from the group consisting of a sulfate ion, a nitrate ion, a perchlorate ion, and Group 17 element ions except for a fluoride ion.

3. The curable composition according to claim 1, wherein the neutral salt catalyst is a salt made by combining a cation and an anion, wherein
    the cation is one selected from the group consisting of Group 1 element ions and Group 2 element ions; and
    the anion is one selected from the group consisting of a chloride ion, a bromide ion, and an iodide ion.

4. The curable composition according to claim 1, wherein the curing agent is an acid-forming agent which carries out cationic polymerization of the epoxy group.

5. The curable composition according to claim 1, wherein the curing agent is a compound containing a fluorophosphate group, a fluoroantimonate group or a fluoroborate group.

6. The curable composition according to claim 1, further comprising a metal-oxide-fine-particle having an average particle diameter of 100 nm or less.

7. The curable composition according to claim 6, wherein the metal-oxide-fine-particle is a silica fine particle.

8. The curable composition according to claim 1, further comprising a metal-oxide-fine-particle in an amount of 0 parts by weight to 150 parts by weight with respect to 100 parts by weight of the condensation product.

9. The curable composition according to claim 8, wherein:
    an amount of the curing agent is 0.5 parts by weight to 10 parts by weight with respect to 100 parts by weight of the condensation product in a case where the curing agent is a curing agent which polymerizes the epoxy group; and an amount of the curing agent is 10 parts by weight to 150 parts by weight with respect to 100 parts by weight of the condensation product in a case where the curing agent is a curing agent which cures the epoxy group when added to the epoxy group.

10. The curable composition according to claim 1, wherein the curing agent is a compound containing at least one selected from the group consisting of a triphenylsulfonium group, a diphenylsulfonium group, and a diphenyliodonium group.

11. The curable composition according to claim 1, wherein the curing agent cures the epoxy group of the curable composition being irradiated with an active energy ray.

12. A cured product obtained by curing the curable composition according to claim 1.

13. A method for producing a laminate comprising:
applying the curable composition according to claim 1 to a base material; and
forming a cured coating by curing the curable composition.

14. A laminate obtained by the method according to claim 13.

15. A curable composition comprising:
a neutral salt-catalyzed condensation product having a weight average molecular weight of 2,000 or more and 30,000 or less and comprising a plurality of first units derived from a first silane compound; and
a curing agent which cures an epoxy group,
the condensation product having a ratio Y/X of 0.2 or less, wherein X is the number of moles of an $OR^3$ group directly bonded to a silicon atom of the first silane compound, and Y is the number of moles of an $OR^3$ group directly bonded to a silicon atom of the condensation product,
the first silane compound having a hydrolyzable silyl group and being represented by: $R^1-(SiR^2_a(OR^3)_{3-a})$,
wherein $R^1$ is an alkyl group having 1 to 10 carbon atoms and having a terminal substituent with an epoxy structure-containing group, each $R^2$ is independently a hydrogen atom or a monovalent hydrocarbon group selected from among an alkyl group having 1 to 10 carbon atoms, an aryl group having 6 to 25 carbon atoms, and an aralkyl group having 7 to 12 carbon atoms, each $R^3$ is independently a hydrogen atom or an alkyl group having 1 to 10 carbon atoms, and a is an integer of 0 to 2.

* * * * *